United States Patent
Isaacs et al.

(10) Patent No.: US 6,471,044 B1
(45) Date of Patent: Oct. 29, 2002

(54) HOLD AND RELEASE SINGULATOR

(75) Inventors: Gerald A. Isaacs, Arlington; James M. Pippin, Keller; Stephen T. Kugle, deceased, late of Arlington, all of TX (US), by Mitchell H. Kugle, executor; Hans-Joachim Grund, Erlaugen (DE)

(73) Assignee: Siemens ElectroCom, L.P., Arlington, TX (US)

( * ) Notice: Subject to any disclaimer, the term of this patent is extended or adjusted under 35 U.S.C. 154(b) by 0 days.

(21) Appl. No.: 09/540,371

(22) Filed: Mar. 31, 2000

Related U.S. Application Data

(63) Continuation-in-part of application No. 09/762,822, filed as application No. PCT/DE99/02376 on Aug. 13, 1998
(60) Provisional application No. 60/131,734, filed on Apr. 30, 1999.

(51) Int. Cl.[7] .................................. B65G 15/12
(52) U.S. Cl. ................. 198/809; 198/347.4; 198/460.1; 198/604; 198/817; 198/620
(58) Field of Search ........................... 198/347.1, 347.4, 198/460.1, 604, 620, 804, 817

(56) References Cited

U.S. PATENT DOCUMENTS 4,120,393 A * 10/1978 Motooka et al. ............ 198/460

(List continued on next page.)

FOREIGN PATENT DOCUMENTS

| EP | 0 780 328 A1 | * 11/1996 | ........... B65G/47/68 |
|---|---|---|---|
| GB | 2 084 531 A | 9/1981 | ........... B65G/47/74 |
| WO | WO 00/09428 | * 2/2000 | ........... B65C/47/29 |
| WO | WO 00/76887 A1 | * 12/2000 | ........... B07C/5/12 |

*Primary Examiner*—Christopher P. Ellis
*Assistant Examiner*—Mark A. Deuble
(74) *Attorney, Agent, or Firm*—Edward Jorgenson; Philip G. Meyers Law Office

(57) ABSTRACT

A hold-and-release singulator includes a conveyor having a transport mechanism for carrying a group of items such as parcels, packages, containers or the like from an entry end towards an exit end of the singulator, a hold and release system that can hold items that have entered the singulator on the conveyor so that such items are not transported by the conveyor while causing one item to be transported by the conveyor, and a control system that controls operation of the conveyor and the hold-and-release system in a manner effective to remove the group of items from the exit end of the conveyor one at a time according to a removal scheme, preferably with a predetermined minimum spacing. The hold and release system can take several forms, such as a mechanism for selectively actuating a portion of the conveyor at a time to remove an item from the exit end of the conveyor, or a mechanism that can hold items off of the conveyor surface so that such items are not transported when the conveyor is running, and selectively set items onto the conveyor surface so that such items are transported when the conveyor is running. In the latter case, the control system controls operation of the conveyor and the hold-and-release system in a manner effective to hold a group of items off of the conveyor surface and then lower the items according to the removal scheme so that the items leave the exit end of the conveyor one at a time with a predetermined minimum spacing. The items may be supported from beneath by a series or array of supports which lift the items, or an arm may suspend the items from above to hold the items off of the conveyor surface.

15 Claims, 16 Drawing Sheets

U.S. PATENT DOCUMENTS

| | | | | |
|---|---|---|---|---|
| 4,150,743 A | | 4/1979 | Lazzarotti et al. | 198/460 |
| 4,634,328 A | | 1/1987 | Carrell | 198/444 |
| 4,925,005 A | * | 5/1990 | Keller | 198/460 |
| 5,141,097 A | * | 8/1992 | Oiry et al. | 198/460 |
| 5,582,286 A | | 12/1996 | Kalm et al. | 198/781.06 |
| 5,629,765 A | | 5/1997 | Schmutz | 356/121 |
| 5,633,487 A | | 5/1997 | Schmutz et al. | 235/462 |
| 5,638,938 A | * | 6/1997 | Lazzarotti et al. | 198/445 |
| 5,653,325 A | | 8/1997 | Enomoto | 198/369.4 |
| 5,682,213 A | | 10/1997 | Schmutz | 349/61 |
| 5,690,209 A | | 11/1997 | Kofoed | 198/370.06 |
| 5,765,676 A | | 6/1998 | Kalm | 198/443 |
| 5,779,023 A | * | 7/1998 | Hidai et al. | 198/418.1 |
| 5,803,230 A | | 9/1998 | Canziani et al. | 198/370.06 |
| 5,808,669 A | | 9/1998 | Schmutz et al. | 348/97 |
| 5,810,158 A | * | 9/1998 | Schiesser et al. | 198/809 |
| 5,889,550 A | | 3/1999 | Reynolds | 348/139 |
| 5,901,830 A | | 5/1999 | Kalm et al. | 198/370.06 |
| 5,906,268 A | | 5/1999 | Kalm | 198/781.06 |

\* cited by examiner

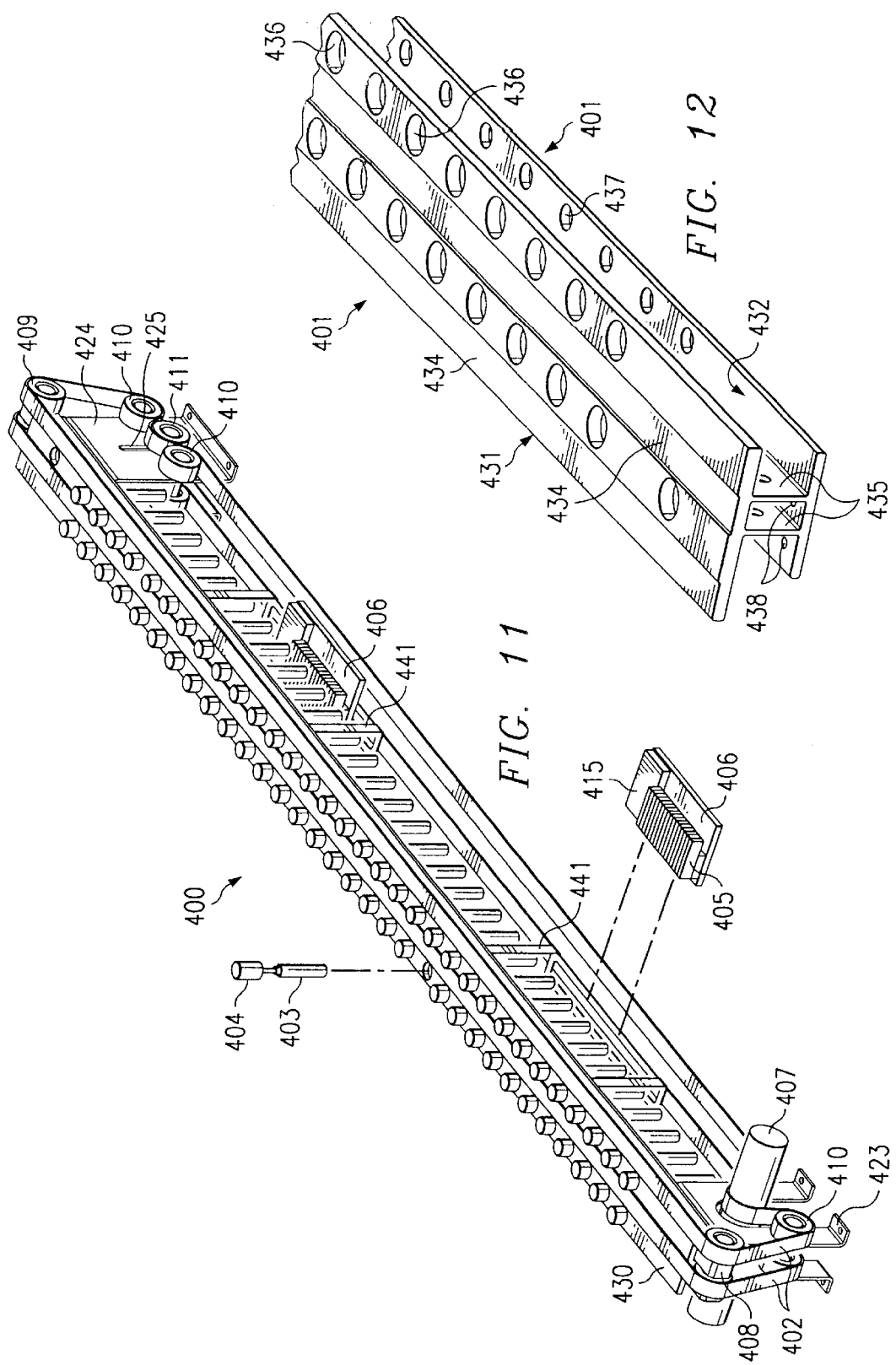

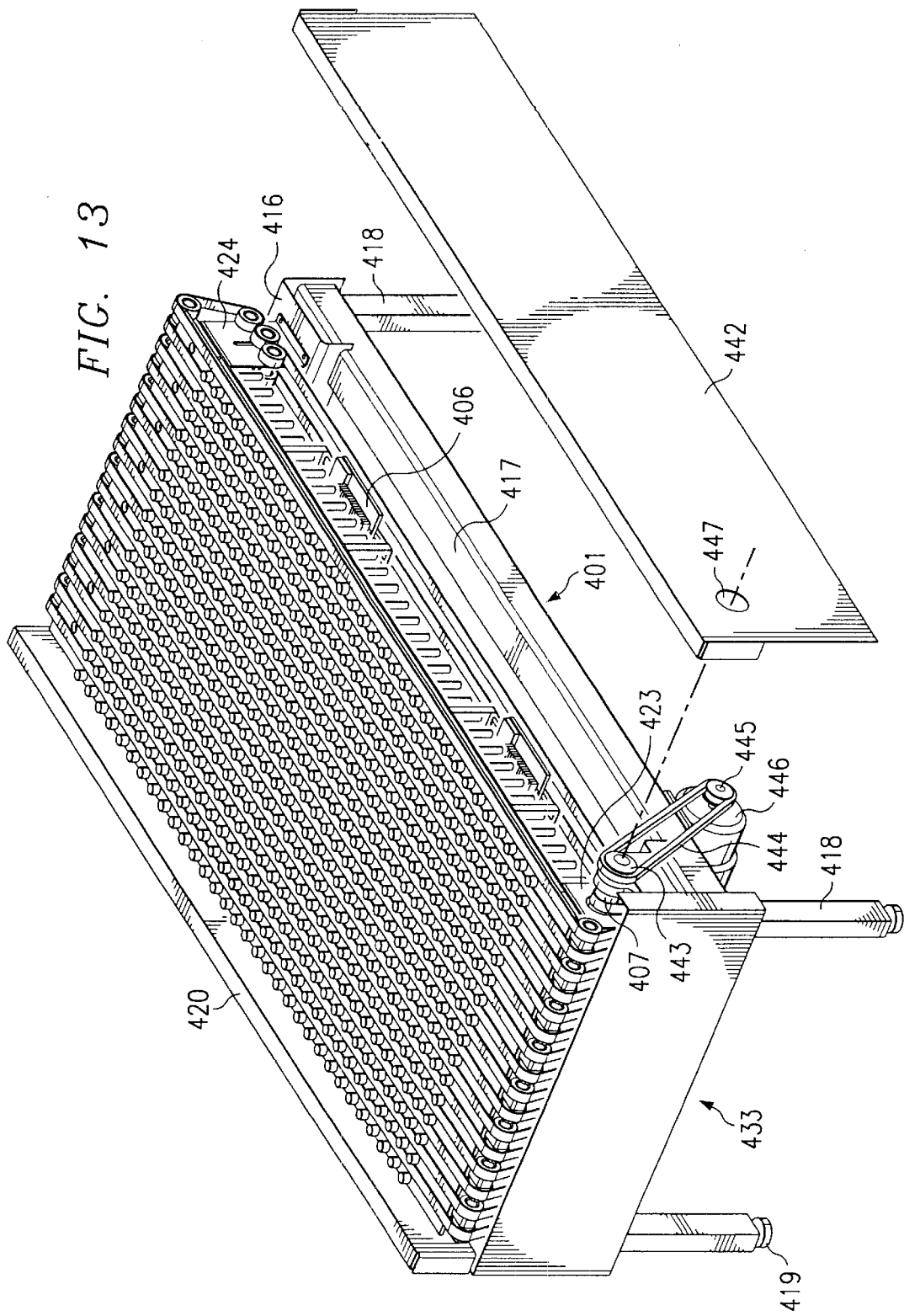

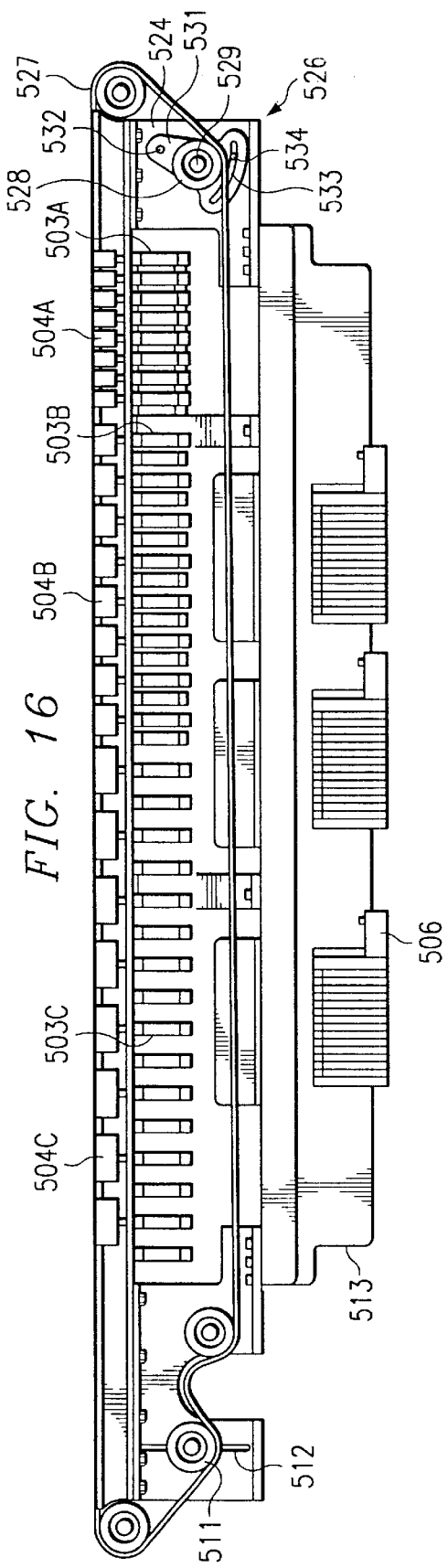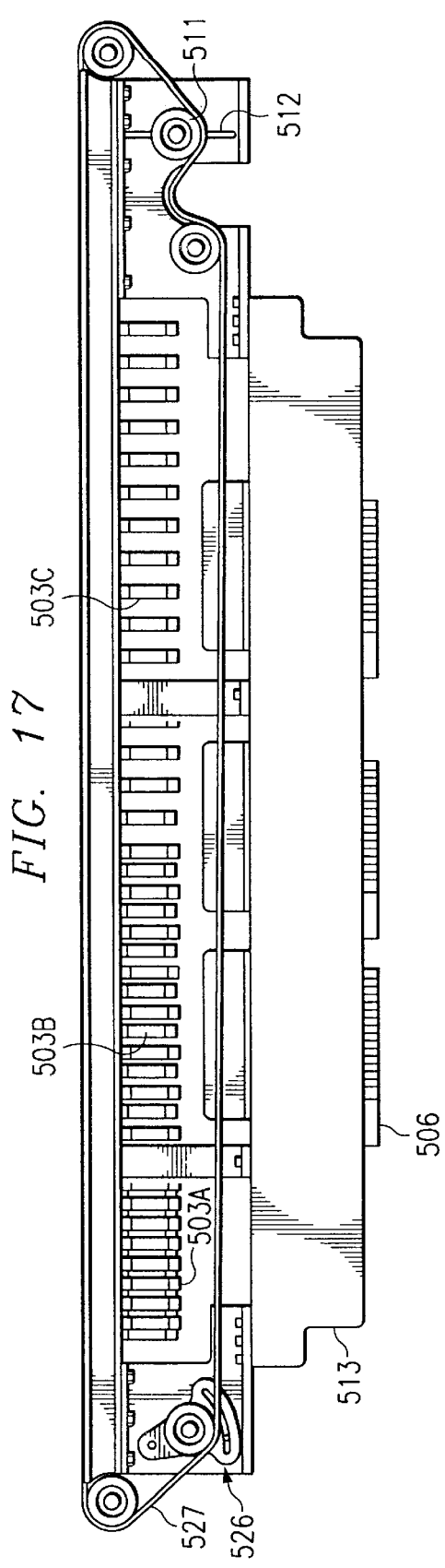

HOLD AND RELEASE SINGULATOR

RELATED APPLICATIONS

This application is a continuation-in-part of U.S. Application Ser. No. 09/762,822, filed Mar. 4, 2001, which has a priority date of Aug. 13, 1998 based upon PCT Application Serial No. PCT/DE99/02376 and a conversion of provisional U.S. application Ser. No. 60/131,734, filed Apr. 30, 1999, which are relied upon for priority and which are incorporated herein by reference for all purposes.

FIELD OF THE INVENTION

The invention relates to a method and apparatus for feeding items into a sorting system, which system includes subsystems for singulation of items such as parcels.

BACKGROUND OF THE INVENTION

In mail handling operations, large quantities of items such as boxes, parcels, packages, or parts varying widely in size, must be inducted into sorter systems. A feeder system for use in processing centers takes a disordered stream of items fed to it on a conveyor and inducts them onto the sorter system. For this purpose, the feeder system ideally should perform several functions. It should, to the maximum extent possible, singulate disordered items to present them to the sorter one at a time with sufficient spacing or separation between items. It must also read destination information from the item so that the control system for the sort can track it through the system and sort it correctly. In the U.S., scannable bar codes are used for this purpose. A third important function is that items that are non-machinable because they are too large, too heavy or the like should be intercepted and removed from the system for special handling.

Singulation is an essential first step in the handling and sorting of items such as parcels or soft packages. Singulation is a process whereby a randomly input stream of items moving on a conveyor system is separated into a stream of single items spaced from each other so that a downstream process can readily perform operations on each item one at a time. Material singulation is a particular challenge in that a mixed material stream may include packages that vary greatly in size and may be piled at random one upon another, forming agglomerates of packages that are difficult to detect and separate.

According to one previously proposed method for singulation, an inclined ramp with holes for applying suction is provided. Items are allowed to slide down the ramp and then suction is applied to hold them in place on the slide. The suction is then selectively released in order release one item at a time. See Interim Report For Phase I, U.S. Postal Service Contract 104230-85-H-0002, Apr. 5, 1985, Electro-Com Automation, Inc., pages 3–10 to 3–13. This method provides one form of hold-and-release singulation, but is of doubtful utility for larger items that may be difficult to hold effectively using suction and that may tend to tumble down a slide, possibly evading the effect of suction and leaving the singulator prematurely. A hold-and-release singulator according to the present invention addresses these difficulties.

SUMMARY OF THE INVENTION

A hold-and-release singulator according to the invention includes a conveyor having a transport mechanism for carrying a group of items such as parcels, packages, containers or the like from an entry end towards an exit end of the singulator, a hold and release system that can hold items that have entered the singulator on the conveyor so that such items are not transported by the conveyor while causing one item to be transported by the conveyor, and a control system that controls operation of the conveyor and the hold-and-release system in a manner effective to remove the group of items from the exit end of the conveyor one at a time according to a removal scheme, preferably with a predetermined minimum spacing. The hold and release system can take several forms, such as a mechanism for selectively actuating a portion of the conveyor at a time to remove an item from the exit end of the conveyor, or a mechanism that can hold items off of the conveyor surface so that such items are not transported when the conveyor is running, and selectively set items onto the conveyor surface so that such items are transported when the conveyor is running. In the latter case, the control system controls operation of the conveyor and the hold-and-release system in a manner effective to hold a group of items off of the conveyor surface and then lower the items according to the removal scheme so that the items leave the exit end of the conveyor one at a time with a predetermined minimum spacing. The items may be supported from beneath by a series or array of supports which lift the items, or an arm may suspend the items from above to hold the items off of the conveyor surface.

An optional vision system for use with the singulator includes a camera that records an image of the items to be singulated by the hold-and-release system, whereby the control system operates the hold-and-release system based on item positions determined from the image. The control system may, for example, include logic for determining which supports support each item to be singulated, and logic for determining the order in which the supports should be lowered in order to singulate the items. This will generally be done by determining groups of supports that support a common item as described hereafter.

According to preferred aspect of the invention, the hold and release singulator includes a conveyor having a transport mechanism for carrying a group of items from an entry end towards an exit end of the singulator. The hold and release system of this embodiment includes an array of supports which lift items from below to hold the items off of the conveyor surface so that such items are not transported by the conveyor, and a retraction mechanism that can be operated to lower the supports beneath one item to permit the item to be transported by the conveyor. A vision system includes a camera that records an image of the items to be singulated by the hold-and-release system. The control system controls operation of the conveyor and the hold-and-release system in a manner effective to remove the group of items from the exit end of the conveyor one at a time according to a removal scheme, which scheme includes logic for determining which supports support each item to be singulated using the image, and logic for determining the order in which the supports should be lowered in order to singulate the items. The conveyor transport mechanism preferably has a series of parallel belts positioned to carrying items from the entry end of the singulator towards the exit end of the singulator, so that the supports can be arranged in rows between the belts. An infeed conveyor may be provided adjacent the entry end of the singulator, and suitable means (such as the image data or a photocell) used to determine when a sufficient group of items has passed onto the singulator conveyor from the infeed conveyor. The control system then further includes logic for stopping the infeed conveyor when the hold-and-release system is in operation.

A method of singulating a group of items according to the invention includes the steps of:

(a) transporting a group of items onto a conveyor of a hold and release singulator, which conveyor includes a transport mechanism which carries the group of items from an entry end towards an exit end of the singulator;

(b) operating a hold-and-release system to hold items that have entered the singulator on the conveyor so that such items are not transported by the conveyor, while causing one item to be transported by the conveyor;

(c) controlling operation of the conveyor and the hold-and-release system in a manner effective to remove the group of items from the exit end of the conveyor one at a time according to a removal scheme; and (d) repeating steps (a)–(c) with successive groups of items. This is largely a batchwise operation, but where a vision system is used, the singulator conveyor can run continuously all or part of the time when the control logic determines from the image data that the items moving on the conveyor are sparse and already widely spaced. Step (b) may comprise holding items off of the conveyor surface so that such items are not transported when the conveyor is running, or selectively actuating a portion of the conveyor at a time to remove an item from the exit end of the conveyor. In a preferred embodiment, the items are transported on an infeed conveyor to the entry end of the singulator, and the infeed conveyor stops when the hold-and-release system is in operation. If an array of supports are provided as part of the hold and release system, steps (b) and (c) preferably further comprise determining which supports underlie items, determining groups of supports among those underlying items which underlie the same item, raising groups of supports which extend through the singulator conveyor in order to lift the items off of the singulator conveyor surface, and successively lowering groups of supports which support each item.

An alternate method of singulating a group of items according to the invention can be employed when the items enter the singulator in a known formation, such as side-by-side forming a square or rectangle. Such a method includes the steps of:

(a) transporting a group of items onto a conveyor of a hold and release singulator in a predetermined formation, which conveyor includes a transport mechanism which carries the group of items from an entry end towards an exit end of the singulator;

(b) operating a hold-and-release system to hold items that have entered the singulator on the conveyor so that such items are not transported by the conveyor, while causing one item to be transported by the conveyor;

(c) controlling operation of the conveyor and the hold-and-release system in a manner effective to remove the group of items from the exit end of the conveyor one at a time according to a removal scheme based on the predetermined formation; and (d) repeating steps (a)–(c) with successive groups of items. Such a method may be used, for example, with successive layers removed from a stack as described further below.

Singulation using the system and method of the invention can be precise or approximate depending on the removal scheme selected, as described hereafter. The occurrence of multiples, i.e., parcels resting upon each other or abutting one another will occasionally cause two or more items to leave the hold-and-release singulator unseparated. These and other aspects of the invention are set forth in the following detailed description.

BRIEF DESCRIPTION OF THE DRAWINGS

The invention will hereafter be described with reference to the accompanying drawings, wherein like numerals denote like elements, and:

FIG. 11 is a perspective view of the conveying module of FIG. 10;

FIG. 12 is a partial, perspective view of the frame of the conveying module of FIG. 10;

FIG. 13 is a right side perspective view of the hold-and-release singulator of FIG. 10, with a side panel removed;

FIG. 16 is a left side view of the conveying module of FIG. 15;

FIG. 17 is a right side view of the conveying module of FIG. 15;

DETAILED DESCRIPTION OF PREFERRED EMBODIMENTS

Figure 1:
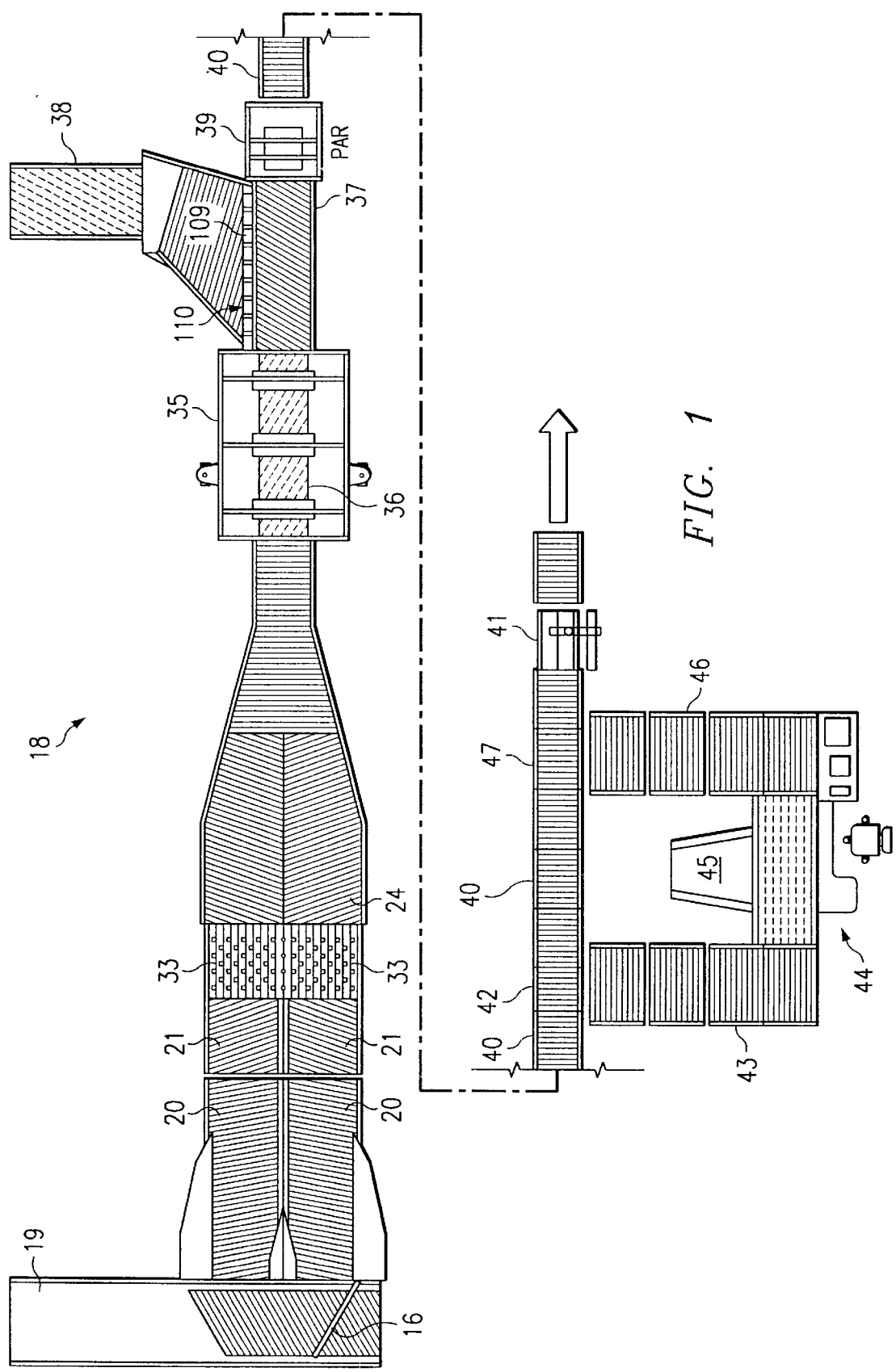
FIG. 1 is a schematic diagram of a feeder-reader subsystem including a hold-and-release singulator according to the invention.
Figure 2:
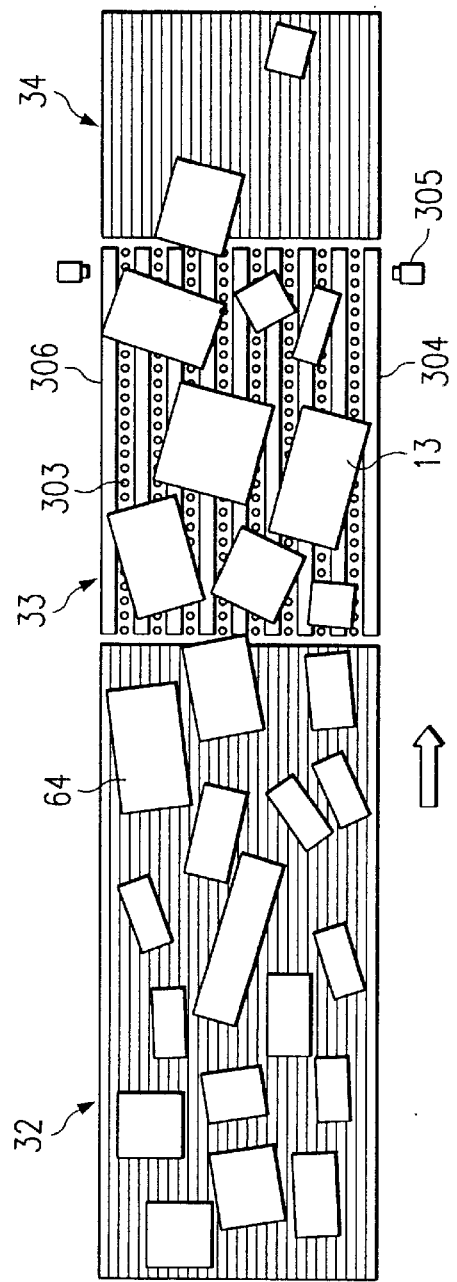
FIG. 2 is a schematic top view of a hold-and-release singulator according to the invention, with housing omitted.
Figure 3:
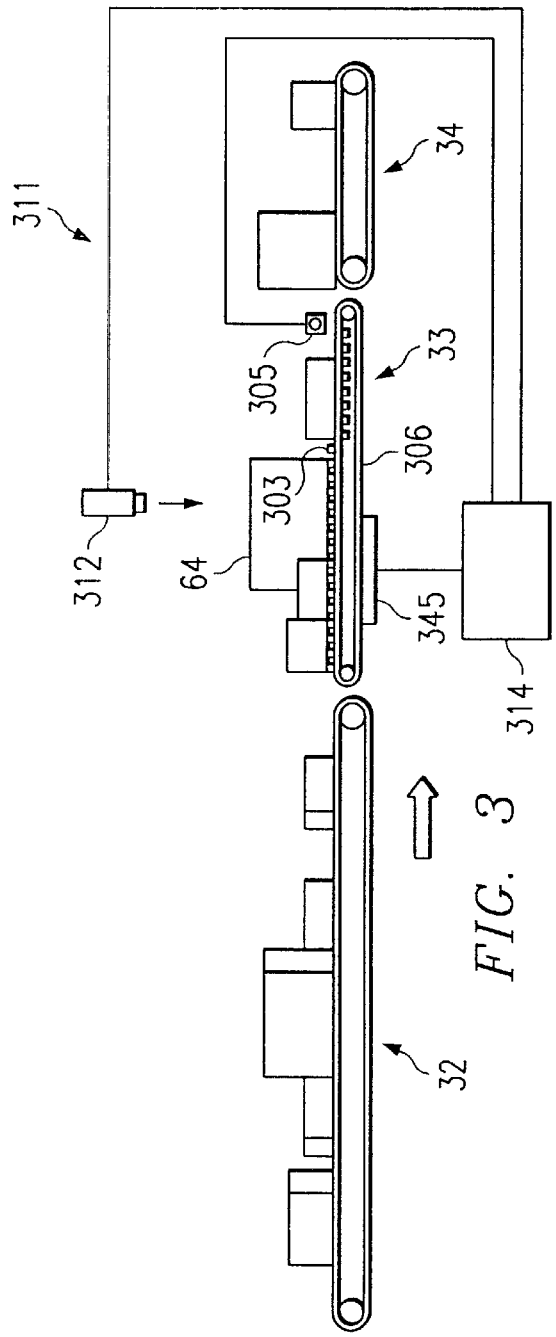
FIG. 3 is a schematic side view of the hold-and-release singulator of FIG. 4, with control system.
Figure 4:
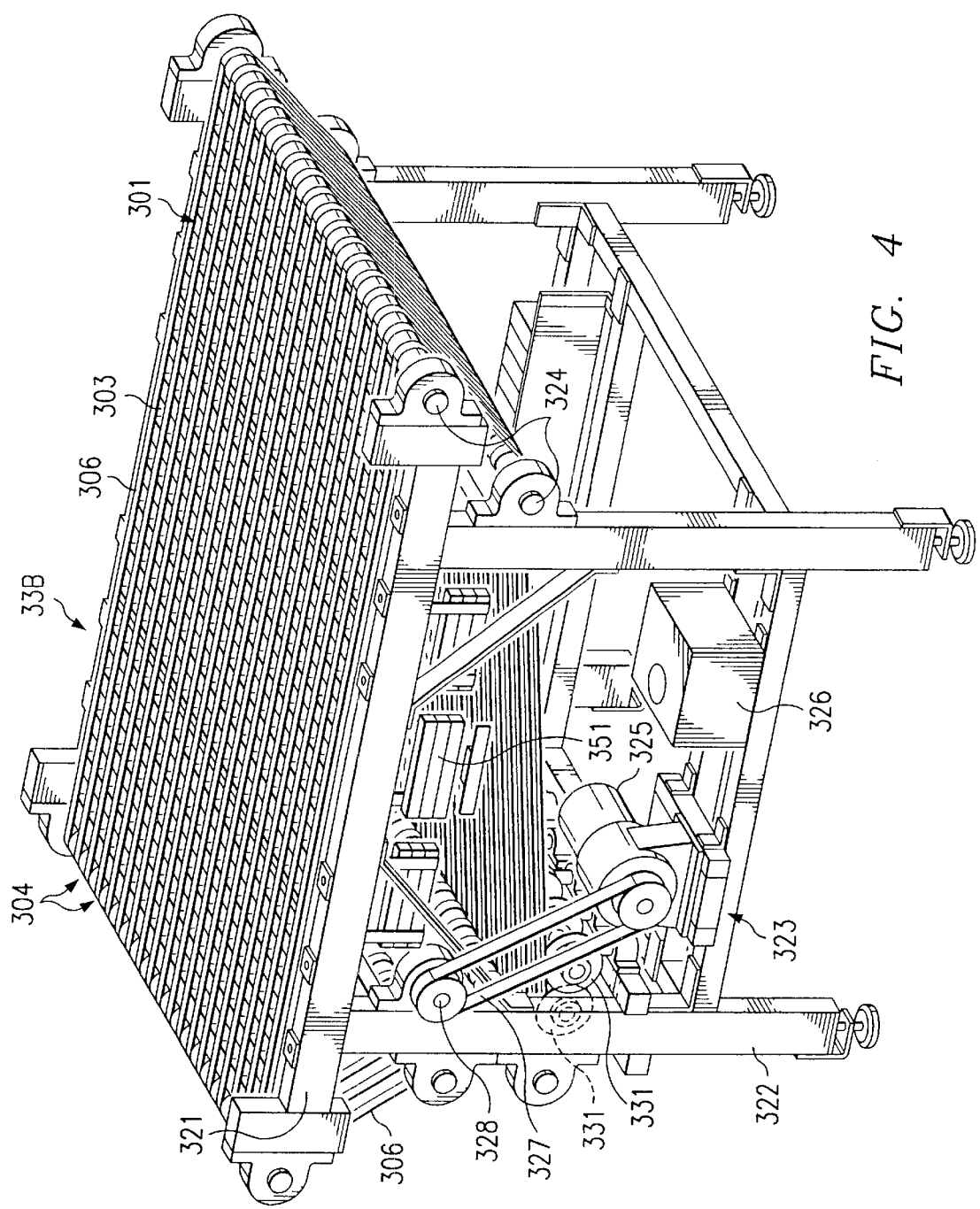
FIG. 4 is a perspective overview of a hold-and-release singulator according to the invention, with pneumatic and electrical connections omitted for clarity.
Figure 5:
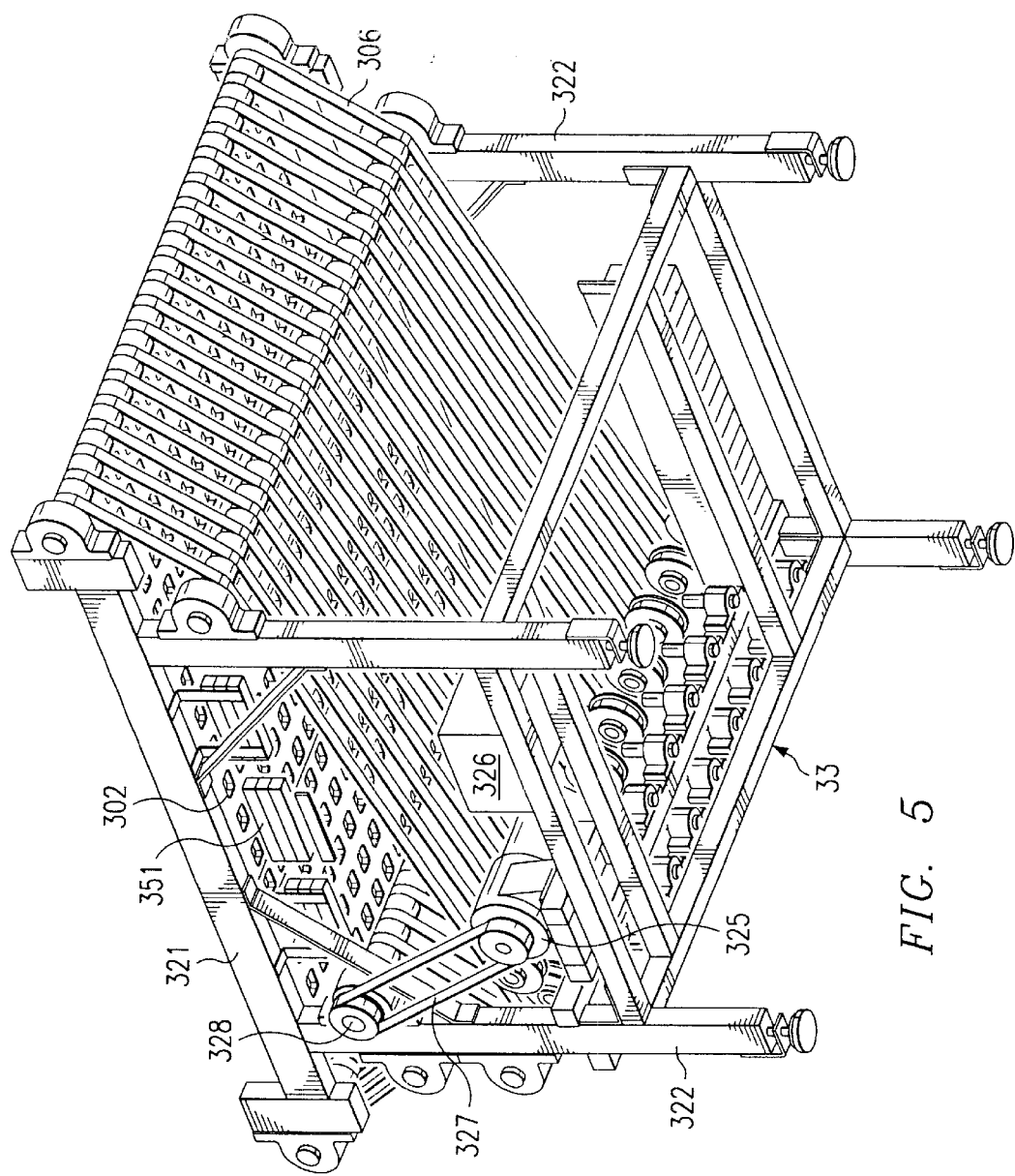
FIG. 5 is a perspective underview of the hold-and-release singulator of FIG. 4.
Figure 6:
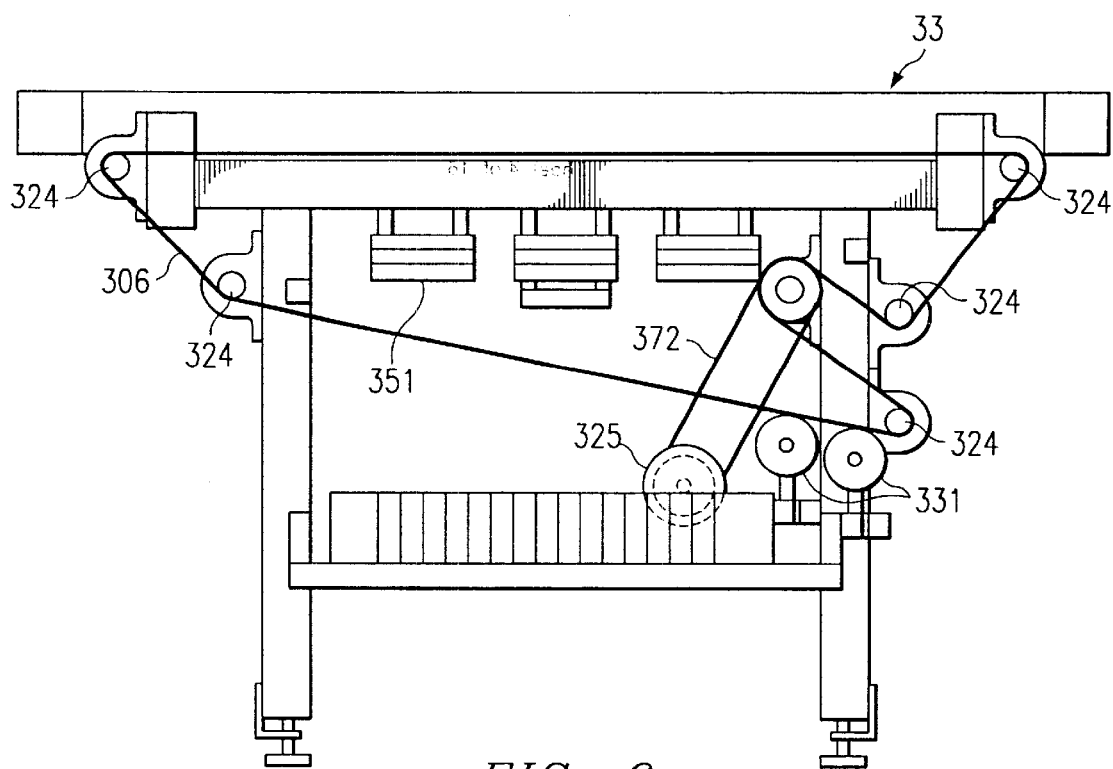
FIG. 6 is a side view, partly in phantom, of the conveyor system of the hold-and-release singulator of FIG. 4.

FIG. 1 illustrates a feeder/reader subsystem 18 incorporating a singulator according to the invention. A continuous flow of material such as parcels is diverted onto a short belt buffer conveyor 20 (single or double) from a parcel belt conveyor 19 by means of a right angle transfer mechanism 16, e.g., a set of angled power rollers with a movable gate. An acceleration or infeed conveyor 21 controls the velocity of the product flow into a singulator module 33. Acceleration conveyor 21 may include an inspection camera and a control system that monitors the items entering conveyor 21. Items in single file with controlled spacing leave hold-and-release singulator module 33 on a transport conveyor 24 and are subject to bar code scanning (single or multiple-side) in a scanning module 35. Integral with the bar code scanning module 35 is a measure and weigh module 36. Scanning tunnel 35 is the initial means of identifying the items issuing from the singulator and entering the parcel processing area. Integrated with the scanning tunnel 35 are the measure and weigh functions. Each mail piece is automatically measured and weighed at this point in the induction line to determine whether it must be diverted because of oversize or overweight. These functions are critical in identifying nonmachinable outsides (NMO's) as well as limiting the spectrum of mail entering the tilt tray sorter to those pieces within its operating specification. NMO's, which are identified by weighing and measuring outside dimensions, are diverted via a high speed divert module 37 having a retractable rail 110 with segments 109 to a conveyor 38 terminating at a transport container bound for the NMO sorter.

Remaining mail flow is introduced to a parcel address reader (PAR) module 39 that automatically reads destination information from the parcel. Items which have then been identified, either by bar code scanning or the parcel address reader 39, are sent through a series of buffer conveyors 40 directly to a labeler 41. Pieces that cannot be identified either by bar code scanning or the parcel address reader are diverted by a divert conveyor section 42 through a series of buffer conveyors 43 to a manual keying station 44, at which the address is read and keyed in by a human operator. Rejects or exceptions that the operator cannot handle leave the system through a chute 45. Following manual data entry, the mail piece is sent back along a further series of buffer conveyors 46 to a merge section 47, at which point the diverted piece rejoins the main stream and enters label applicator 41. Thus, following identification by one of the three means described, each mail piece is labeled with destination information on its top face by labeler 41 before induction onto a tilt tray sorter (not shown). The transfer of a package onto the tray of the tilt tray sorter is carried out in a manner known in the art.

A feeder/reader subsystem 18 such as the foregoing is under computerized central control. The central controller monitors the throughput of the system and tracks each item once it has been identified, e.g., by maintaining in memory a table of data relating to each item in the system between the scanning tunnel 35, where it first becomes possible to identify the item with a destination, and the induction end of the system at which the items are inducted into the tilt tray sorter. Such information is communicated to a master control system for the sorter so that the item or mail piece continues to be tracked by the sorter.

Hold-and-release singulator 33 according to the invention combines a simple mechanical platform with intelligent control to provide a singulator with a small "footprint", i.e., that takes up relatively little space in the conveying and sorting system in comparison to longer systems that rely on gradual de-concentration of items thereon. In FIG. 1, a pair of hold-and-release singulators 33 are shown side-by-side. The controller sequences the cycles of the left and right singulators 33 so that while one is filling with parcels the other is discharging singulated parcels. Thus, an uninterrupted flow of singulated parcels is fed to the remainder of the induction system.

FIGS. 2–9 show a general purpose embodiment of singulator 33 wherein an infeed belt conveyor 32 brings items 64 to singulator 33 that leave one at a time on an downstream exit belt conveyor 34. Singulator 33 consists of a flat plate 301 with a matrix of through holes 302 designed to accommodate supports 303 that may be extended or retracted. Each lengthwise row 304 of retractable supports 303 has a drive belt 306 on either side of it. As items 64 are introduced onto plate 301 by the infeed conveyor 32, multiple drive belts 306 sliding on the plate 301 convey items 64 into position. When the plate 301 is adequately covered with items, drive belts 306 stop, and the matrix of supports 303 extend to lift each item 64. Suitable means are used to determine when the plate 301 is adequately covered. Vision system 311 as described below could be used for that purpose, a human operator could make the decision, or stopping could be keyed to interrupting the beam of a photocell 305 disposed near the exit end of singulator 33 to detect along the width of singulator 33. With the items 64 held above the plate 301 and drive belts 306, drive belts 306 are started and brought to an appropriate speed.

A vision system 311 including a camera 312 processes an image of parcels 64, determining the exact two-dimensional location of the perimeter of each parcel relative to a fixed point. Camera 312 is preferably positioned sufficiently far from the upper surface of singulator 33 to avoid significant parallax errors. The information from vision system 311 is analyzed by a controller 314 such as a PLC or personal computer to determine which supports 303 are beneath each parcel 64. For this purpose, software analyzes areas of contrast on the image looking for patterns identifying corners, and then constructs outlines of parcels 64 based on the detected corner positions.

Once each item has been identified on the image, the image is mapped onto the known layout of supports 303. A number of groups of supports 303 are identified and stored in memory as associated with a specific item or parcel 64. The order of appearance of items 64 is usually determined starting with the one closest to the exit end of singulator 33 and ending with the one furthest therefrom. Controller 314 releases items 64 one at a time by retracting the appropriate groups of supports 303. As the supports 303 under each parcel are retracted, the parcel engages the drive belts 306 and exits the singulator 33 at a controlled speed and spacing. The order of release of the items is often but not always in order of distance from the exit end of the conveyor. For example, if one item is widely spaced from the next, it may be desirable to lower the further item first so that it at least partially catches up with the nearer one before lowering the nearer one, thus improving system throughput. The control system can determine an appropriate release scheme based on the item positions as indicated by the image and the predetermined target for minimum (and optionally maximum) spacing between items.

In the alternative, vision system 311 could be omitted, and sensors such as tactile sensors or light sensors could be supplied in the ends of supports 303. Groups of supports 303 could then be determined by controller 314 based on which supports reported positive sensor input, and multiples could be detected by inconsistent readings of the sensors. For example, where a larger package is completely overlying a smaller one, some sensors will not read as "covered" because the larger package is lying at an angle on the smaller one. Such an incomplete sensor pattern could be adjudged a double, and the support groups assigned and actuated accordingly to try to remove the package closer to the exit of singulator 33 first. As a further alternative, hold-and-release singulator 33 could also be operated in a non-intelligent manner by dropping supports 303 in widthwise columns one column at a time while continuously running belts 306 in the expectation of taking first packages off first.

FIGS. 4–9 show one embodiment of a hold-and-release singulator 33 in detail. A rigid metal frame 321 with upright legs 322 at its corners supports plate 301 in which a large array of supports 303 are mounted. Belts 306 are driven by a drive system 323 including a series of pulleys 324 and an electric drive motor 325 run by a motor controller 326. Upon receiving a run signal from controller 326, motor 325 runs a drive belt 327 which rotates a drive shaft 328. Belts 306 are each wound over drive shaft 328 under tension from pulleys 324 and two staggered rows of tensioning and guide rollers 331. The relatively large spacing between the upper and lower flights of belts 306 provides space for a pneumatic or mechanical system to operate the supports 303.

Figure 8:
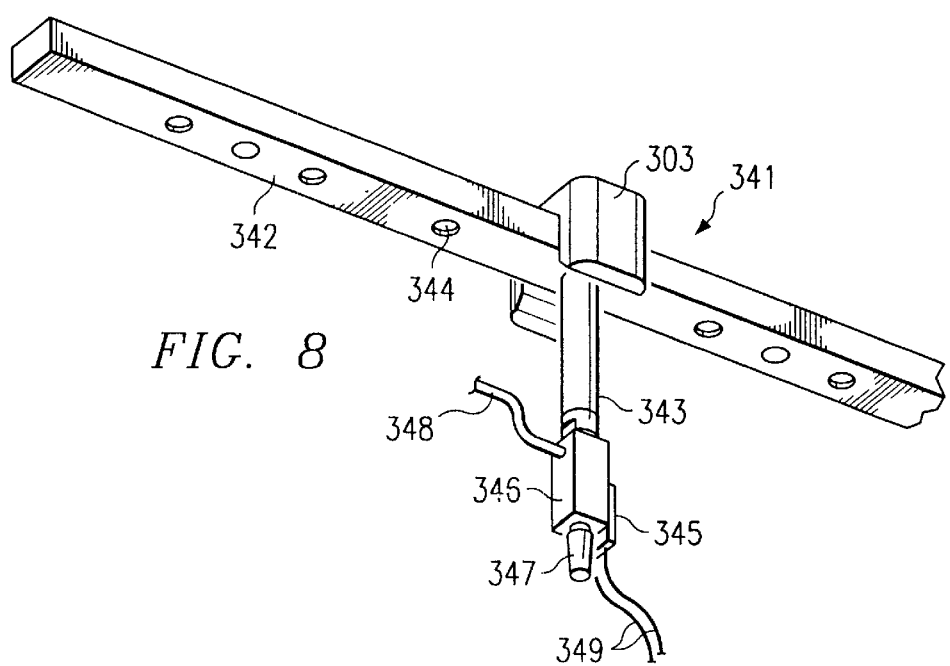
FIG. 8 is a perspective view of a lifter assembly used in the hold-and-release singulator of FIG. 4.
Figure 7:
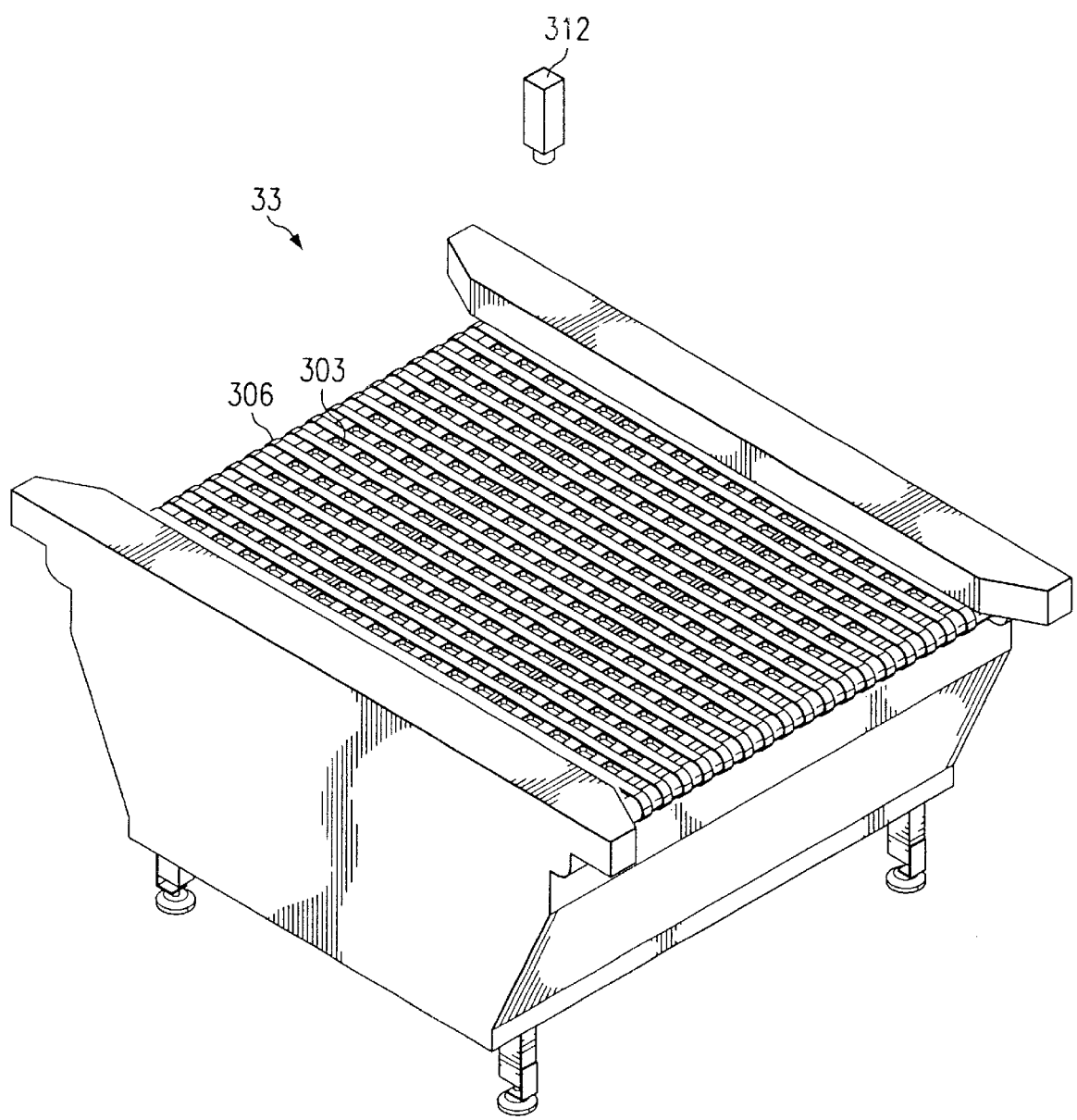
FIG. 7 is a top perspective view of the hold-and-release singulator of FIG. 4, with the housing included.

FIG. 8 illustrates an individual support assembly 341. Each support 303 takes the form of a U-shaped button mounted open side down on an elongated bar 342 on which an entire row of supports 303 are mounted. An air cylinder 343 is mounted beneath support or 303 and extends through one of a series of holes 344 in bar 342. Cylinder 343 is pressurized to extend support 303 by opening a solenoid valve 346 which has an exhaust muffler 347. Valve 346 is connected to a supply of compressed air through a hose 348 or similar conduit, such as a passage machined or molded in a solid part. Operation of valve 346 is controlled by an electrical actuator 345 connect to a power supply by wires 349. All of the actuators 345 are ultimately connected to and controlled by master controller 314, and are actuated in groups in accordance with the control scheme as described above.

Figure 9:
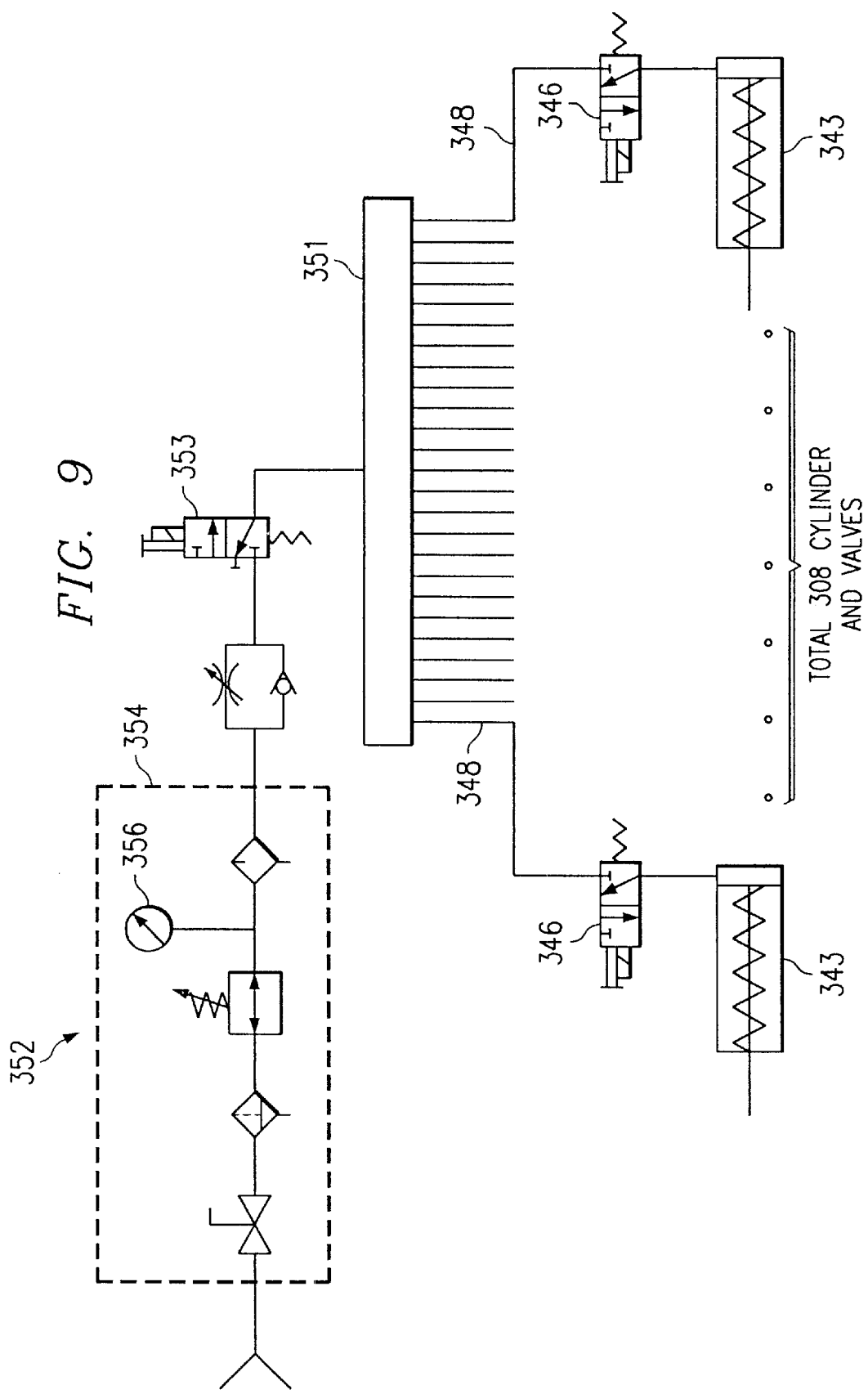
FIG. 9 is a schematic diagram of the air supply system for the lifter assemblies used in the hold-and-release singulator of FIG. 4.
Figure 10:
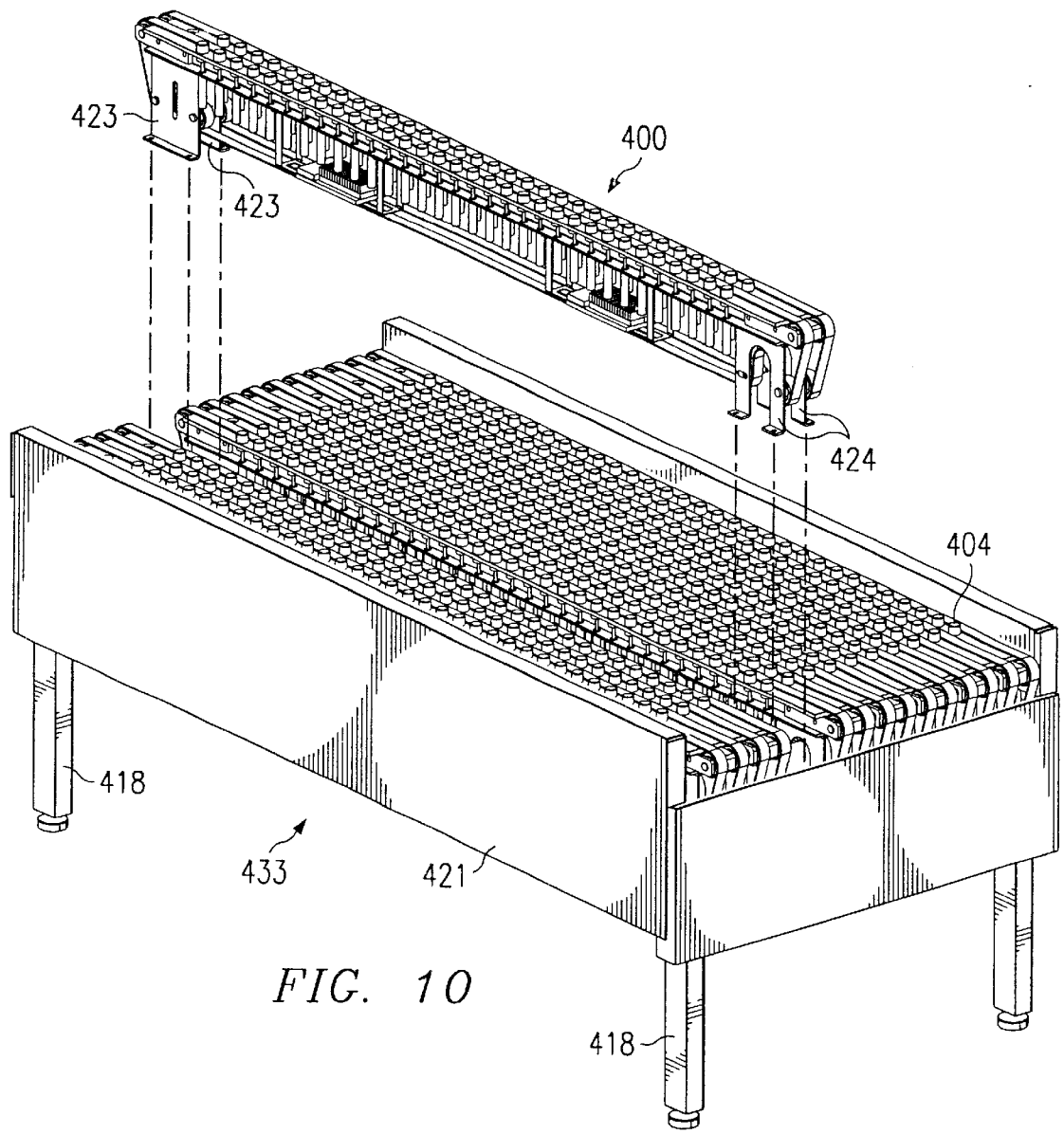
FIG. 10 is a left side perspective view of an alternative embodiment of a hold-and-release singulator according to the invention, with a conveying module removed.

A multitude of hoses 348, omitted from FIGS. 4 to 7 for clarity, are connected to one or more plastic block manifolds 351 having openings for connection to one end of each hose 348. FIG. 9 illustrates the connections of the pneumatic system 352. A master solenoid valve 353 controls the supply of compressed air to manifold 351, and a compressed air supply module 354 including a pressure gauge 356 supplies compressed air to the system 352. As an alternative to such a system, a hydraulic system or a purely electrical system, such as an array of solenoid actuated supports, could be employed.

Singulator 33 accepts single-layer batches of items or other items from upstream infeed conveyor 32 and dispenses them one at a time to downstream conveyor 34. Singulator 33 releases the individual output items so that a prescribed gap is maintained between each item. Upstream conveyor 32 should be controlled to provide an adequate supply of items in a single layer to ensure necessary throughput for the downstream process or to provide a sufficient quantity of items to enable singulator 33 to achieve its optimal or maximum throughput. Upstream conveyor 32 typically operates in a batchwise mode. It is preferably equipped with controls so that it starts and stops in response to the operation of singulator 33 without starving it or overfeeding it. Items on upstream conveyor 32 should generally be closely packed to ensure adequate throughput, but if the items are too closely packed, it may result in stacking, that is, non-single layering. If the items are too closely packed together, performance may deteriorate because of the difficulty the vision system camera has distinguishing the individual items.

In contrast with the upstream conveyor 32, downstream conveyor 34 may operate in a continuous mode, since items are released one at a time in a substantially uniform stream. Immediately after the last item is released, upstream conveyor 32 is started so that the next batch of items can begin to flow onto the singulator 33. Thus, singulator 33 becomes fully reloaded almost as soon as the last item from the previous batch exits from it. The regularity of the downstream progression of items is disrupted only slightly by the relatively short processing time requirement associated with the positional analysis and the calculation of the release schedule for the items in each new batch. Upstream and downstream conveyors 32, 34 may be belt conveyors, roller conveyors, or any other suitable type. When upstream conveyor 32 feeds singulator 33, its speed is closely matched to the singulator belt speed, so that the relative positions of the items are not disrupted as they pass from the upstream conveyor onto the hold-and-release singulator.

A feeder/reader subsystem such as the one described above is only one of many possible uses to which hold-and-release singulation according to the invention can be put, and as such the items may be virtually any two- or three-dimensional objects of sufficient size in need of singulation. After leaving the singulator, the items can be edged into a single file for further processing, such as part identification, address identification, multiple detection, wrapping, coating, painting, quality control inspection, and the like.

FIGS. 10–13 illustrate a second specific embodiment of a hold-and-release singulator 433 according to the invention. Singulator 433 provides a modular, scalable mechanical platform with intelligent controls to provide a singulator with a small footprint. Singulator 433 can determine the geometry of a small group of randomly oriented items in a single layer, use an algorithm to select the order in which the units will exit, and then mechanically execute the movement of items in turn. An item could be a box, container, or virtually any other discrete material that can be conveyed.

Singulator 433 includes a rigid metal frame 421 with upright legs 418 at its corners similar to the corresponding parts of the preceding embodiment. However, plate 301 and array of supports 303 are replaced by a series of convey and support modules 400 which are disposed side-by-side and mounted by pairs of front and rear mounting brackets 423, 424 to opposite ends thereof to frame 421 as shown. This enables, for example, a malfunctioning module 400 to be removed and replaced without extensive disassembly.

As shown in FIG. 11, each module 400 includes an actuator frame 401, a pair of conveying belt(s) 402, and two lengthwise rows of pneumatic actuators 403. Actuators 403 are capped by object supports 404 which may be independently extended or retracted via one or more actuator control modules 406 mounted on module 400 itself, rather than on the side of frame 421. Media supports 404 are cylinders with concentric tapped holes on the bottom for attachment of the pneumatic cylinder rod of actuator 403. In the illustrated embodiment, two actuator drive modules 406 are mounted to the bottom face of actuator frame 401. A controller mounting bracket 441 supports each control module 406. Front and rear groups of actuators 403 are controlled by front and rear modules 406. Each module 406 consists of 32 miniature, 3-way, two position single solenoid pneumatic valves 405 attached to a manifold and a Profibus discrete control module 415. Modules 406 require 24-volt power input, system air, and Profibus cabling input. Each miniature valve 405 is plumed with 4 mm ID flexible tubing (not shown for clarity) to the A, B ports on a ¾" bore, ¾" stroke double acting pneumatic cylinder within each actuator 403.

In this manner, the potential problems with running a large number of tubes to the side of the machine are avoided. A single air inlet line branches to the manifold of each module 406. Similarly, a single power supply line and a single control system connection line are preferably provided for each module 400 in order to minimize the difficulty of changing a module. The length of module 400 is scalable, and any number of modules 400 may be attached to a common frame 421 side-by-side to meet application specific width requirements. The resolution and stroke of supports 404 may be varied to accommodate different objects to be transported.

Pneumatically actuated supports 404 have been described, but other types of supports can be used, including solenoids, hydraulic or motor-actuated supports, or other mechanical devices such as lever-operated ones. The layout and density of the support grid is a function of the physical characteristics of the items that need to be processed. Important parameters include physical dimensions, weights, packaging parameters such as stiffness and durability, frictional characteristics, and resistance to damaging forces.

Actuators 403 and supports 404 are mounted through actuator frame 401 which is in the form of an I-beam as shown in FIG. 12. Frame 401 may be an aluminum extrusion, hard anodized to resist wear due to belt friction. Frame 401 has an upper horizontal flange 431 and a narrower lower horizontal flange 432 connected by a pair of parallel walls 435. Upper flange 431 has a pair of laterally spaced, lengthwise indentations 434 on its upper surface that act as guides for belts 402 and a pair of laterally spaced, lengthwise rows of clearance holes 436 in which supports 404 slidingly fit. Lower flange 432, which is narrower than upper flange 431 by the width of the endmost indentation 434, has a row of tapped mounting holes 437 which support the lower ends of each actuator 403 in alignment with supports 404 and holes 436. Lower flange 432 also has pairs of end holes 438 for securing the I-beam frame 401 to brackets 423, 424 by any suitable means, such as nuts and bolts.

Parallel conveying belt(s) 402 of each module 400 are wound over a common drive shaft 407 to achieve a linear velocity that can be varied by electronic motor control. Drive shaft 407 is polyurethane coated to increase drive friction. Each belt 402 is routed over double-ended head and tail end idler rollers 408, 409 and a pair of double-ended intermediate idler rollers 410 to accommodate drive shaft 407 and a belt tensioning takeup roller 411. The length of each belt 402 is minimized compared to the preceding embodiment. Although a doubledended takeup roller 411 may be used, belts 402 will wear at different rates, and thus it is preferred to permit the position of each takeup roller 411 to be adjusted individually by repositioning it within a slot 425 in brackets 424.

Front mounting bracket 423 consists of a sheet metal frame with two pairs of fixed intermediate idlers 408, 410. Bracket 423 is recessed such that the belt drive shaft 407 is positioned between the idler pairs 408, 410 in order to maximize contact area between belts 402 and drive shaft 407. Each bracket 423 is secured to a transverse beam (416, only one shown) on the machine frame 421 with bolts or machine screws. Rear bracket 424 similarly consists of a one-piece sheet metal frame on which are mounted two pairs of fixed idler rollers 410, a pair of tensioning rollers 411 and a jackscrew assembly 412. Manually turning the jackscrews from the top adjusts the tensioning rollers to increase or decrease individual tensions. Rear bracket 424 attaches with bolts or machine screws to a second transverse beam 416 on the opposite side of machine frame 421.

FIG. 13 shows singulator 433 with a side panel 442 removed. A pulley 443 at one end of drive shaft 407 is connected by a belt or polychain 444 to a drive pully 445 mounted on a drive shaft of a gear motor 446. Motor 446 is mounted on the underside of frame 401. A hole 447 in side panel 442 may be provided so that pulley 443 is mounted outside of side panel 442 for ease of access. Motor 446 drives all of modules 400 as directed by a master controller similar to controller 314, which also controls the operation of the individual control modules 406. Velocity matching of belts 402 to the belt 440 on an infeed conveyor 439 is accomplished with encoder feedback to VFD gear motor 446.

Figure 14:
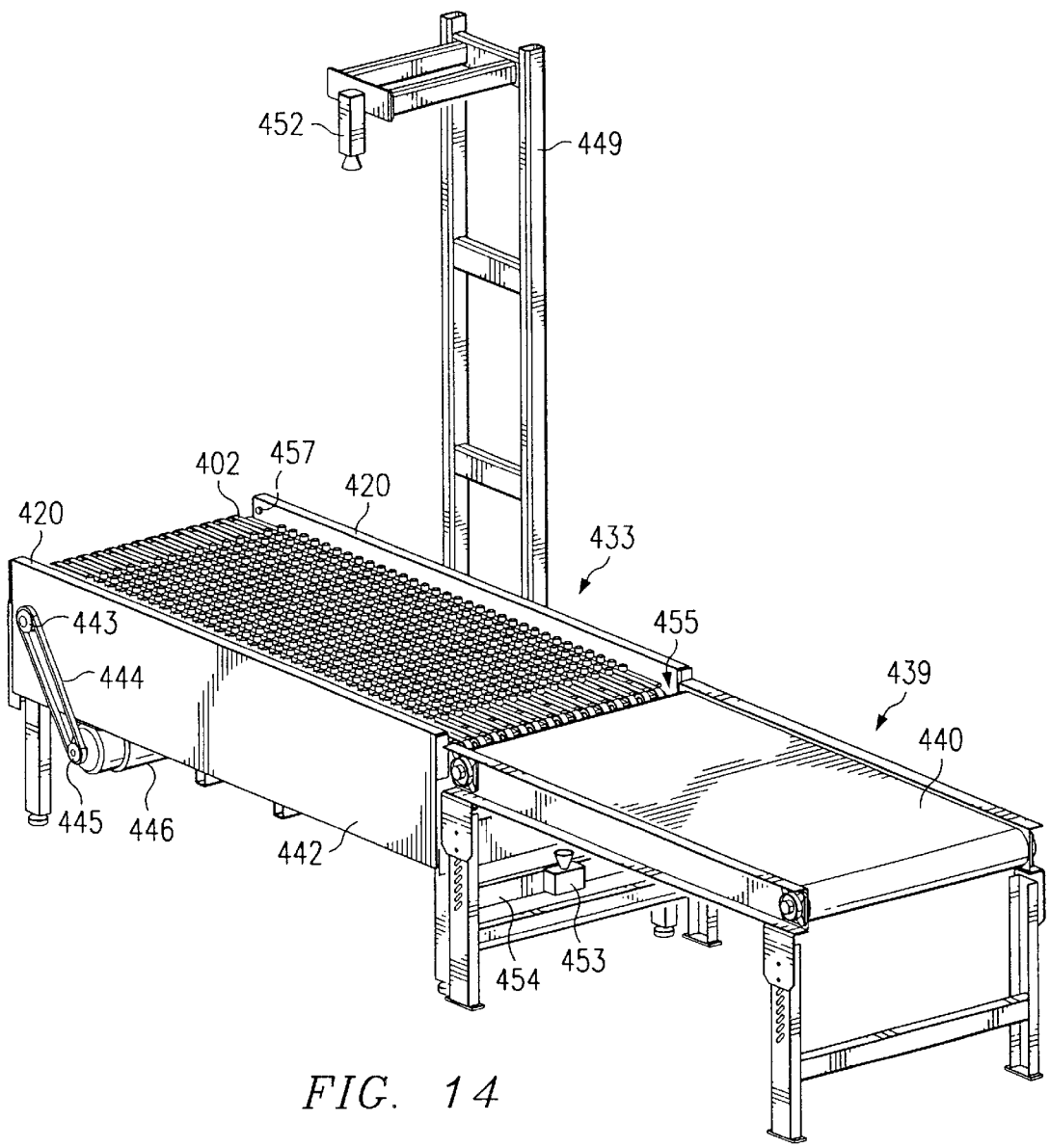
FIG. 14 is a right side perspective view of the hold-and-release singulator of FIG. 10, with an adjoining infeed conveyor and vision systems.

Referring to FIGS. 13 and 14, frame 421 of singulator 433 is preferably a welded assembly including sheet steel and structural tubing components. Two transverse channel (C) beams 416 are welded to two 4" square tubes 417. Sheet metal side-guards 420 serve to protect the moving parts of modules 400 and guide the media within a singulator bed 412. Four legs 418 with leveling pads 419, motor 446, and an area camera tower 449 are attached to tubes 417. Area camera tower 449 is a welded assembly of structural tubing, preferably with an adjustable camera mount for precise alignment (FIG. 14) of an area camera 452. A line scan camera 453 may be provided on a mounting beam 454 to observe the gap 455 between singulator 433 and infeed conveyor 439 as described hereafter.

Figure 15:
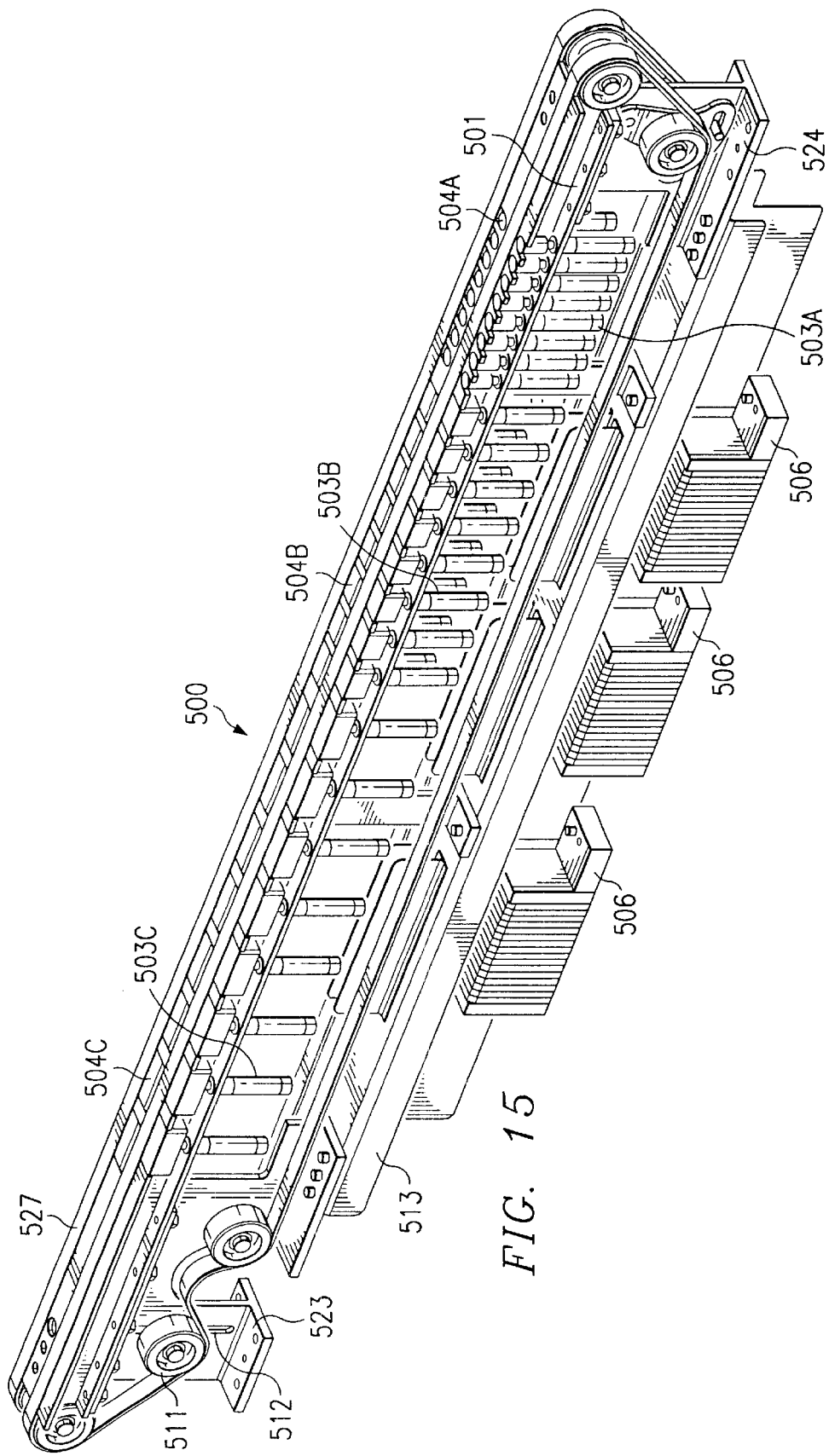
FIG. 15 is a perspective view of an alternative conveying module of the invention.

FIGS. 15–17 illustrate a modified hold-and-release module 500. Module 500 is generally similar to 400. A lengthwise frame in the form of a perforated plate 501 is secured to the singulator frame crossbeams 416 by a pair of head and foot (front and rear) brackets 523, 524. Control modules 506 each control operation of groups of 16 air cylinders and are preferably centered on the group of cylinders controlled. Tensioning rollers 511 are located adjacent the drive shaft and can be loosened and moved vertically in grooves 512. A lower bracket 513 spans end brackets 523, 524 and provides a surface on which modules 506 can be mounted.

A pair of tension adjustment mechanisms 526 are provided on opposite sides of module 500 to permit adjustment of the tension of each belt 527 individually, since belt wear can occur unevenly. Mechanisms 526 each include a roller 528 mounted on an axle 529 set on an inverted, generally triangular plate 531. Plate 531 is mounted on bracket 524 by means of a screw set into aligned holes 532 in plate 531 and bracket 524 at the narrow end of plate 531. When the set screw is loosened, bracket 524 can pivot about its point of attachment by means of an elongated, arc-shaped groove 533 at the wide end of plate 531 and a support 534 projecting from the side of bracket 524 into groove 533, limiting its travel to positions appropriate for engagement of the outer periphery of roller 528 with the associated belt 527. Selectively repositioning of plate 531 by this means is used to vary the tension of belt 527.

Actuators 503 and supports 504 are divided into three groups 503A–504A, 503B–504B, and 503C–504C. Actuators 503A on the entry side near the infeed conveyor are the most closely spaced and have the smallest supports 504A. Intermediate actuators 503B adjacent and downstream from actuators 503A are more widely spaced than actuators 503A and have larger supports 504B. In particular, supports 504B are elongated in the direction of travel and may be rectangular. The last group of actuators 503C adjacent and downstream from actuators 503B are more widely spaced than actuators 503B, and have supports 504C that are larger and more elongated than supports 504B. As a result of this layout, module 500 has fewer actuators 504 than a comparable module 400 of the same length, reducing the overall cost of the unit. The control system using a line scan camera as described further below, is modified to determine the overall size of each item moving onto the singulator made from modules 500. If an item is small it will be stopped in the first zone and held on supports 504A. If it is larger the control system will if possible pass it to the intermediate size zone with supports 504B, or to the large size supports 504C.

The following discussion the hold-and-release process uses singulator 433 as an example, but is applicable to the other described embodiments as well. Immediately after the last item in the previous batch is released from singulator 433, it is allowed to move far enough to create a specified gap behind it, and the singulator belts 402 are brought to a momentary stop. The downstream conveyor does not necessarily have to be brought to a stop simultaneously, unless item tracking considerations mandate stopping it and synchronizing its action with the singulator. Then, singulator 433 and upstream conveyor 439 are brought up to speed synchronously so that a new batch of items transfers from upstream conveyor 439 onto singulator 433 without significantly disrupting the relative positions of the items.

In the discussion that follows, the vision system referred to may be an area vision system such as 311, a line scan system 700 as described below, or other optical systems known in the art for recording the position of objects in a field of view. Each of these systems has advantages, and selection of the optimum system will vary depending on the layout of the conveyor system in which the hold-and-release singulator is used.

The vision system is employed either in conjunction with the transfer, or subsequent to the transfer, of items from an upstream conveyor from the singulator 433. This vision system determines the ultimate location coordinates of the perimeter vertices of every item in the batch, i.e., the pixel coordinates that define the precise location of each item in its resting position on singulator 433 after the singulator belts 402 have come to a complete stop. The vision system reports these pixel coordinates to a machine control system. That system then relates those coordinates to the specific support structures on the singulator. The supports 404 are extended, suspending the appropriate items far enough above singulator 433 to ensure that they will not be driven by the singulator belts 402 once they are brought back up to speed. Generally, the first item that is scheduled to be released is not suspended. If the vision system detects that several items are already sufficiently spaced for release, those items are not suspended either. This optimizes throughput and also saves energy and mechanical wear on the equipment.

After appropriate identified items have been suspended, the singulator belts 402 are brought back up to speed, allowing the non-suspended items to proceed from singulator 433 toward the downstream conveyor. Then, as sufficient gaps develop behind those items as they move toward the downstream conveyor, additional supports 404 are retracted, allowing additional items to be released in an orderly fashion onto the singulator belts 402, i.e., the items are dispensed onto the downstream conveyor with appropriate gaps between items. When the last item has proceeded sufficiently far onto the downstream conveyor to ensure a prescribed following gap, singulator belts 402 are stopped, and the cycle is repeated, bringing the next batch of items onto the singulator. The singulator belts are stopped on each cycle so that belt speeds ahead of and beyond the vision camera can be synchronized. Otherwise, its position might be perturbed as the product passes onto the singulator, reducing the reliability in assessing its location on the singulator.

In one implementation, area scan camera 452 is mounted a sufficient distance from singulator 433 so that a sufficiently parallax-free image can be generated and analyzed to determine the perimeter vertex coordinates of each item on singulator 433. Another implementation deploys line-scan camera 453. The line scan camera 453 looks across gap 455 between upstream conveyor 439 and singulator 433. The camera can be mounted either above or below gap 455. In either case, the moving items are preferably back-lit from the other side of gap 455 so that a silhouette of the items is generated for analysis. If an invariant scan rate is used, it is necessary to ensure that the items travel across the gap at a constant speed to avoid distorting the item images and misjudging their final positions on the singulator. On the other hand, if an encoder is used to pace the camera scan rate, it is possible to eliminate the distortion and positional uncertainty of the items that would otherwise occur if the belt speed is not uniform. Thus, acceleration and deceleration of the belts while items are passing across the slot can be tolerated.

The line-scan camera technique completely eliminates parallax in the direction perpendicular to the scan slot. In order to eliminate parallax in the direction parallel to the slot the camera must either be mounted a significant distance from the slot, or an optical system must be developed to overcome the problem. In the current implementation of the product a parabolic strip mirror is used to focus parallel light beams into the camera. Alternatively, a lens or a fresnel strip could be used to achieve the same effect. An overhead fluorescent light silhouettes the items as they pass across the slot and the mirror focuses the parallel beams passing between the adjacent items so that the individual items can be discriminated.

According to one aspect of the invention, a polygon-building algorithm is used to determine which areas of the image reported by the vision system correspond to discrete items. Once an image has been acquired by the vision system, a threshold value is calculated to convert the image to a binary image. The threshold function is different and depends on the type of lighting used to acquire the image. Once the image has been binaried, all the objects in the image are processed in the same manner. Image processing development software from Logical Vision Inc. may be used to create the application. The following steps are typical of the process, and represent a current implementation of this invention.

First, holes in the binary images are filled in to eliminate thresholding errors. A "blob detection" algorithm is used to locate each area that may be an item of interest. The perimeters of the blobs, i.e., discrete areas of darkness, are found. A filter function is then applied to delete any areas that are too small to be of interest. The number of areas remaining is counted, and if there are none, a "NO ITEM" message is sent to the control system. When there are areas corresponding to items to be processed, lines are fitted to the perimeter points. These lines are further processed to produce an outline of each area. The number of lines that are used to outline the area is used to determine if further processing is required. If there are five or fewer lines, the item is considered a single item. More than five lines requires further processing. Returning to the thresholded image, a function measures the distance from a pixel to the edge of the item. This transformed image is thresholded. The resulting binary image of each item is smaller than the original.

These steps are repeated and a perimeter walk algorithm further processes those items that still have an excess number of lines. Starting at one corner of the polygon, the perimeter is traversed clockwise leg by leg. At each intersection, the path turns either left or right. If a left turn is encountered, the path is deemed to have moved from one item onto another. If all turns are to the right, the item is deemed a single item such as a soft bag with contents that make it appear to be many sided.

Objects that have been determined to be multiple items are further processed to determine the amount of overlap and the possibility of separating them. Items with only a small amount of space between them can be separated without further information. The use of height finding processes such as laser ranging, or the use of a side vision system the creates a vertical profile of the items, may allow one item to be identified and released while continuing to support the other. When all items that can be positively identified as single items are found, the coordinates of the corners or the location of the supports for each item are sent to the control for the conveyor system. The location of multiple items that could not be separated is also sent but an indication that it is a multiple is transmitted so that it can be handled correctly, for example, diverted out of the stream using a divert mechanism.

Once the item perimeter positions have been determined, the pertinent supports 404 for each identified item are determined by constructing a matrix of lines representing the sides of each identified polygon. Starting from each point that represents the location of a support 404, a hypothetical line is drawn to a point beyond the boundary of the singulator 433. Then the number of intersections of that theoretical line with other lines representing polygons is counted. Any point that lies within a closed polygon crosses other lines in the matrix an odd number of times, and points outside any closed polygons cross the other lines in the matrix an even number of times. The polygon associated with any internal support is the one having the boundary that was first crossed. In this manner, appropriate supports 404 for each of the polygons that the vision system identifies are determined. A computer or programmable logic controller is programmed to schedule the retraction of each group of supports to dispense the items in a prescribed order and with appropriate spacing between items. An algorithmic technique for this determination is described in detail in *Algorithms in C,* by Robert Sedgewick, published in 1990 by Addison-Wesley. The gaps between items can be closely regulated as a simple function of singulator belt speed, item size, and the relative locations of the items.

When using line-scan camera 453, the conveying speeds of the singulator belts 402 and in-feed conveyor belt 440 are matched by electrical or mechanical means such that an item does not experience a speed change when moving from the in-feed conveyor 439 to singulator 433. Line-scan camera 453 is mounted such that it has a field of view between singulator 433 and in-feed conveyor 439 along the entire width of each, i.e., the full width of gap 455. As a batch of units is conveyed onto singulator 433, camera 453 acquires a series of one-dimensional images (lines) at a frequency triggered by a timer or encoder.

One or more discrete sensors, such as photocells 457, may be used as "look across" sensors to detect the leading or trailing edge of the media entering or leaving singulator 433. When the leading edge of the first unit is detected by look across sensor 457, or image calculations indicate that it has reached such a position, conveyor and singulator belts 440, 402 stop. The images taken by the camera are assembled into a collective two-dimensional silhouette of all the units in the batch. The two-dimensional image is digitally correlated to the support coordinates, thus giving a mathematical representation of the exact relationship of each unit to each support 404. Control software analyzes the image to determine which supports 404 are covered by items, and formulates the exit sequence in the same manner as described above for the area camera mode of operation. The system including the singulator 433, infeed conveyor 439 and the controller connected thereto may be operated using an area camera, a line-scan camera, or a combination of the two. For example, the area camera is invoked if the line scan data is corrupted, or both images are generated and then compared as a check on accuracy.

Figure 18:
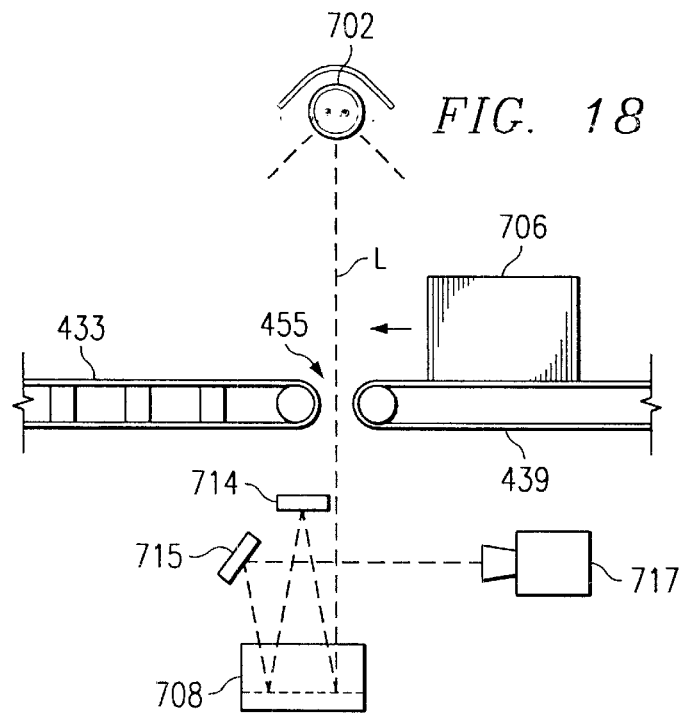
FIG. 18 is a schematic diagram of a first alternative line scan vision system of the invention.

Referring to FIG. 18, mirrors can be used to allow the area or line scan cameras to be at any angle to the direction as needed to acquire the image, and to aid in concentrating light. For example, a preferred parallax-free line scan vision system 700 according to the invention includes a light source, such as a fluorescent light bulb 702, oriented with its length in the widthwise direction of infeed conveyor 439 and singulator 433 over narrow, widthwise gap 455 that exists between the two machines. An item 706 carried by the infeed conveyor 439 will pass over gap 455 as it enters singulator 433. Light L from light source 702 shines continuously down through gap 455 to a mirror 708 that is parabolically curved in the widthwise directions of conveyor 439 and singulator 433. Light L is reflected from mirror 708 to a flat mirror 714 mounted above mirror 708 and at a position slightly offset from the path of the light that travels directly from light source 702 to mirror 708. Flat mirror 714 in turn reflects light L back to mirror 708. The beam of light L is then reflected a second time from mirror 708 to a second flat mirror 715 mounted above mirror 708. Mirror 715 is more highly angled that mirror 714 and is at a position slightly offset from the path of the light that travels to mirror 714 the first time. Mirror 715 is disposed at an angle suitable so that light L then is reflected directly into digital camera 717. This path for the light traveling from light source 702 to camera 717 serves to shorten the perceived optical path for the digital camera. Mirror 708 may be slightly angled towards mirrors 714 and 715 to facilitate light collection.

As item 706 passes over gap 455, its front edge is detected as an advancing line of darkness. The resulting image is collected one widthwise line (or row) at a time until enough rows (lines) have been collected to build a full image of the item 706. The image is then processed using when the image started, when the image stopped, and the width of the image to calculate coordinates that are stored in controller memory for use. This allows tracking of the exact location of the area of darkness corresponding to an item 706 to determine the actual supports 404 to raise if the movement is to be stopped for singulator 433 to function (i.e., a pause for a hold-and-release cycle). Positions of items after they traverse gap 455 are calculated based on the synchronization, controlled movements of conveyor 439 and singulator 433. Once an item exits the process window, its data drops off the far edge of the scrolling image as new data are continuously added at the leading edge of the scrolling image. In this manner, it is not necessary to use a photocell to determine when to stop the conveyor belts for a hold-and-release cycle. If desired for more accurate control, the line vision system may be repositioned upstream from gap 455 (e.g., 5–15 feet therefrom) so that an image of incoming items on the infeed conveyor can be maintained in addition to the image of items that have entered singulator 433.

Data collection pauses and the image resets when conveyor 439 stops while singulator 433 functions to separate items as described above. However, continuous image collection of the line vision system 700 permits the system to run continuously when the items on conveyor 439 and singulator 433 are not in need of singulation. If several items pass by line vision system 700 with sufficiently wide spacing, the system does not need to be stopped.

Figure 19:
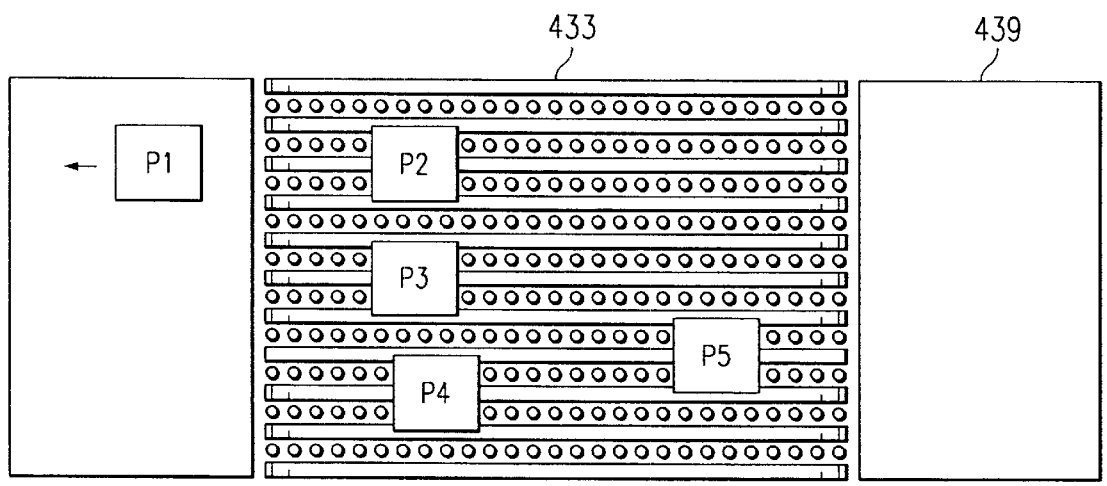
FIG. 19 is a schematic diagram illustrating a release process using a hold-and-release singulator with a line scan vision system according to the invention.

Line vision system 700 can be controlled to run conveyor 439 and singulator 433 continuously, pausing for a hold-and-release cycle only when necessary. For example, line vision system 700 detects that items P1, P4 and P5 shown in FIG. 19 are sufficiently spaced, in both widthwise and lengthwise directions, so that the system could run continuously but for items P2 and P3, which require singulation from each other and P4. The controller of the line vision system 700, using the image data, determines that it can transport P1 all the way through without stopping based on the length of singulator 433 and the spacing between items. Once P1 has left singulator 433, conveyor 439 stops, and singulator 433 is operated to hold items P2-P4 and then release items P2 and P3 in sequence. Once P3 has been released by the singulator 433, the controller determines that remaining items P4 and P5 are sufficiently spaced, and returns to running continuously. This capability permits higher throughput in light load conditions in which the number of items passing by gap 455 indicates singulation is seldom needed. Unlike the previous embodiment, it is not necessary to stop conveyor 439 and singulator 433 in order to take an image and make the necessary calculations. However, a scrolling image could also be constructed using an area camera system.

Figure 20:
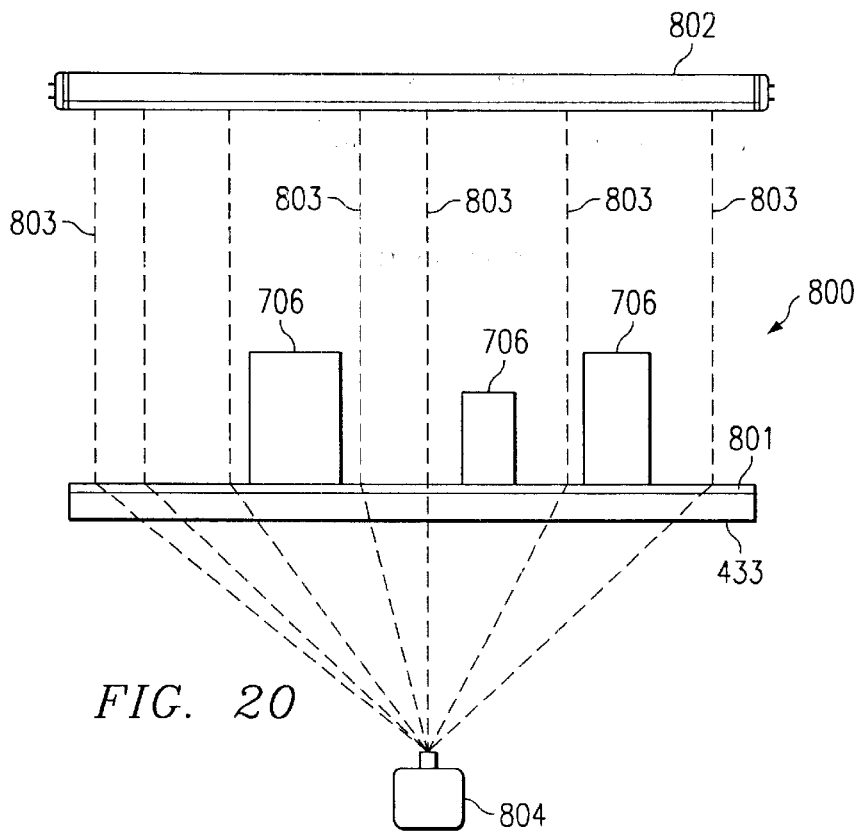
FIG. 20 is a schematic diagram of a second alternative line scan vision system of the invention.

FIG. 20 illustrates an alternative embodiment of a line scan system 800 according to the invention wherein parallax problems in viewing items 706 are corrected by means of a lens such as a Fresnel lens 801 that spans the width of singulator 433. Illumination is provided from above (or below) by suitable source such as a fluorescent light 802 at least as long as the width of the singulator 433. Light beams 803 pass down through the gap between singulator 433 and the infeed conveyor and through lens 801, which concentrates the light towards a centrally mounted digital camera 804.

The items referred to in the foregoing discussion may be items (packages or parcels), containers such as bags of mail, or other products. For some products, lifting the item from below may not be the optimum way to achieve the hold-and-release process. According to a further embodiment of the invention, a hold-and-release singulator according to the invention can be used for "depalettization", i.e., removal of objects from a stack one layer at a time. It is conventional for items such as canned or bottled beverages to be transported in cartons of 4, 6, 12 or 24 bottles or cans. The cartons are stacked on palettes in layers using one of many possible predetermined configurations.

Figure 21:
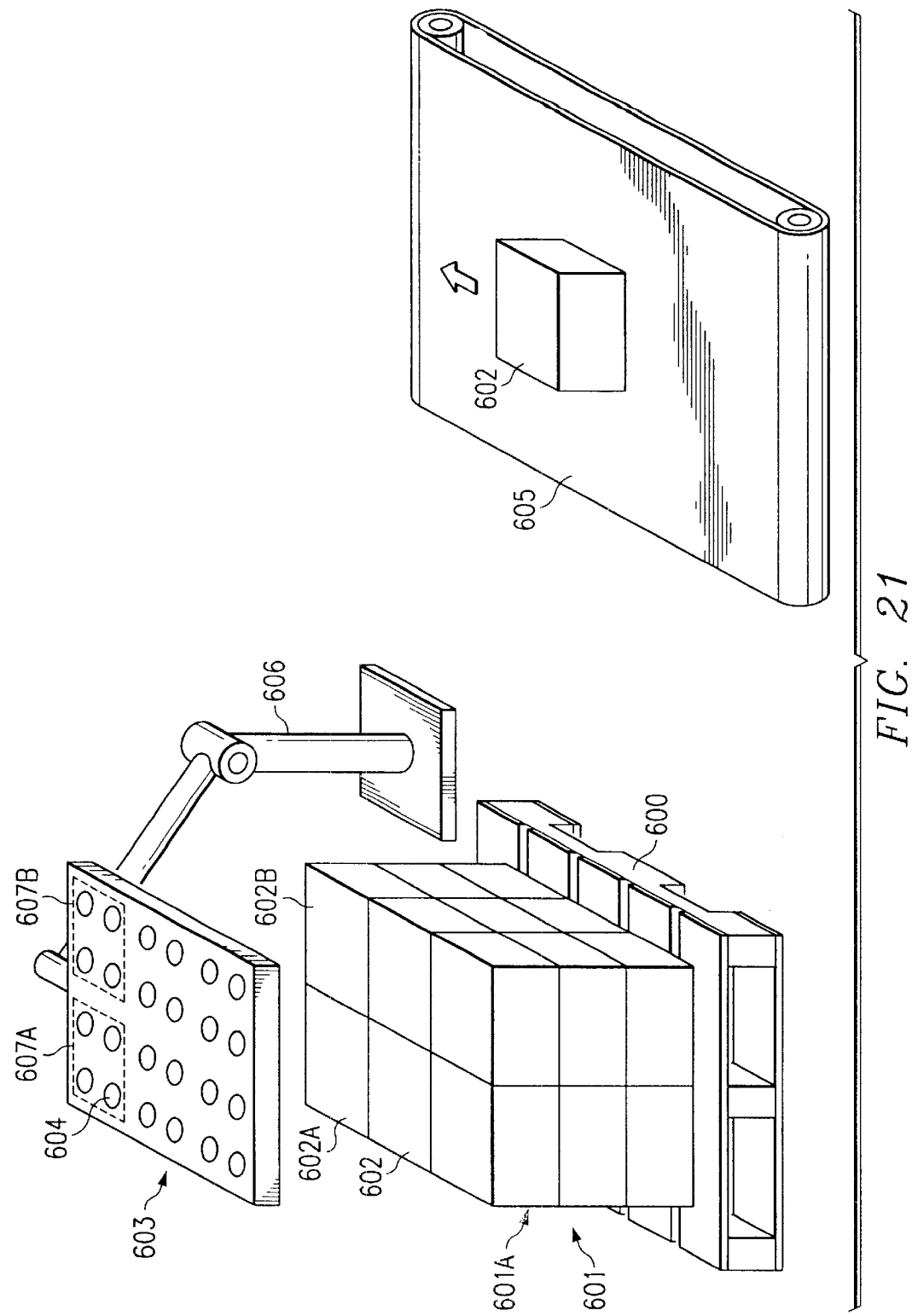
FIG. 21 is a schematic diagram of a further alternative form of hold-and-release singulator system according to the invention.

In FIG. 21, a palette 600 of soda 12-packs is arranged in layers 601. A hold-and-release transport system 603 includes an array of suction supports 604 which are controlled individually in substantially the same manner as the supports described in the preceding embodiments. The top layer 601A of cartons 602 is lifted off of the stack and transported to a conveyor 605 by any suitable means, such as a pivoting robot arm 606 on which system 603 is mounted. Since the pattern in which the cartons are laid out is known in advance, no vision or detection system is needed. A first group of suction holders 607A holding the first carton 602A are turned off, so that carton 602A drops onto conveyor 604, which may be moving continuously. After a suitable delay, suction is cut off to a second group of holders 607B so that the second carton 602B drops down, and so on until all of the cartons 602 in layer 601 have been deposited and singulated. If a variety of customary layouts of cartons are used in a specific application, a control system can store the patterns in memory and can determine which release pattern system 603 uses. It may be, for example, that two layouts are used alternately in successive layers 601, so that control system causes system 603 to alternate between two predetermined release patterns as it moves back and forth depositing each layer 601.

Alternatively, another system for singulating layers according to the invention uses a layer transport system wherein a pair of arms of a transport device grips an entire layer 601 of perhaps 20–25 cartons at a time, and transports the entire layer to the surface of a hold-and-release singulator 33 or 433 of the invention. Singulator 33 or 433 then singulates each item or carton 602 using a predetermined release pattern for the supports analogous to the one used for suction holders 604. This embodiment has the advantage of improved efficiency in that the robotic transporter can be in the process of retrieving another layer 601 as the singulator 33 or 433 is releasing items 602 one at a time, so that the stream of items 602 coming off conveyor 605 to a chosen destination is essentially continuous.

Figure 22:
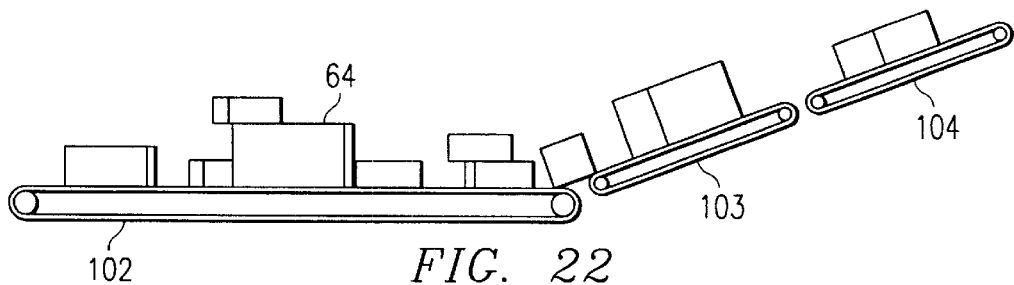
FIG. 22 is a schematic side view of another alternative form of hold and release singulation system according to the invention.
Figure 23:
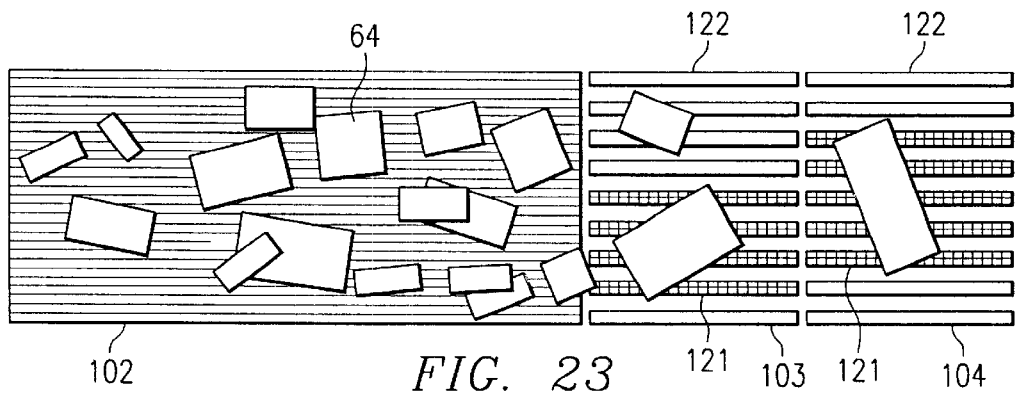
FIG. 23 is schematic top view of the singulation system of FIG. 22.

FIGS. 22 and 23 illustrate an alternative form of singulation system wherein a first, essentially horizontal conveyor 102 feeds to a series of inclined conveyors 103, 104 that form an upward ramp. The belts of the ramped (or horizontal) conveyors are controlled individually so that some parcels are moving upwards on active belts 121 while others remain stationary on idle belts 122. Belts 121, 122 can be controlled by a vision system as described herein that identifies the lead parcel for each section and the belts which support it, running those while others remain idle. The crossovers from one inclined conveyor to another help segregate items that are lined up in the lengthwise (conveying) direction.

It will be understood that the foregoing description is of various preferred exemplary embodiments of the invention, and that the invention is not limited to the specific forms shown, but is limited only by the scope of the invention as expressed in the appended claims. For example, although the system and methods of the invention have been described with reference to specific items such as cartons and mail pieces, it will be apparent that a wide variety of three-dimensional items can be fed and singulated in the manner described.

What is claimed is:

1. A hold and release singulator, comprising:
   a conveyor including a transport mechanism for carrying a group of items from an entry end towards an exit end of the singulator;
   a hold and release system that can hold items that have entered the singulator on the transport mechanism so that such items are not transported by the conveyor, while causing one item to be transported by the conveyor;
   control system that controls operation of the conveyor and the hold-and-release system in a manner effective to remove the group of items from the exit end of the conveyor one at a time according to a removal scheme and
   a vision system including a camera that records an image of the items to be singulated by the hold-and-release system, and the control system includes logic for operating the hold-and-release system based on item positions determined from the image.

2. The singulator of claim 1, wherein the hold and release system includes a mechanism for selectively actuating a portion of the conveyor at a time to remove an item from the exit end of the conveyor.

3. The singulator of claim 1, wherein the hold and release system includes a mechanism that can hold items off of the conveyor surface so that such items are not transported when the conveyor is running, and selectively set items onto the conveyor surface so that such items are transported when the conveyor is running, and the control system controls operation of the conveyor and the hold-and-release system in a manner effective to hold a group of items off of the conveyor surface and then lower the items according to the removal scheme so that the items leave the exit end of the conveyor one at a time with a predetermined minimum spacing.

4. The hold-and-release singulator of claim 3, wherein the hold-and-release system includes a series of supports which lift items from below to hold the items off of the conveyor surface.

5. The hold-and-release singulator of claim 3, wherein the hold-and-release system includes a mechanism for suspending items from above to hold the items off of the conveyor surface.

6. The singulator of claim 1, wherein the vision system is positioned upstream from the entry end of the singulator conveyor at a gap spanning the width of the entry end of the conveyor singulator and further comprises
   a light source for illuminating the gap as items pass over the gap, the camera being positioned to receive light from the light source passing through the gap, and
   a device for reducing parallax errors in the image.

7. The singulator of claim 1, wherein the conveyor includes a series of parallel belts positioned to carrying items from the entry end of the singulator towards the exit end of the singulator.

8. A hold and release singulator, comprising:
   a conveyor including a transport mechanism for carrying a group of items from an entry end towards an exit end of the singulator;
   a hold and release system including an array of supports which lift items from below to hold the items off of the conveyor surface so that such items are not transported by the conveyor, and a retraction mechanism that can be operated to lower the supports beneath one item to permit one item to be transported by the conveyor;
   a vision system including a camera that records an image of the items to be singulated by the hold-and-release system; and
   a control system that controls operation of the conveyor and the hold-and-release system in a manner effective to remove the group of items from the exit end of the conveyor one at a time according to a removal scheme, which scheme includes logic for determining which supports support each item to be singulated using the image, and logic for determining the order in which the supports should be lowered in order to singulate the items.

9. The singulator of claim 8, wherein the conveyor includes a series of parallel belts positioned to carrying items from the entry end of the singulator towards the exit end of the singulator, and the supports are arranged in rows between the belts.

10. The singulator of claim 8, further comprising:
    an infeed conveyor adjacent the entry end of the singulator;
    means for determining when a sufficient group of items has passed onto the singulator conveyor from the infeed conveyor; and
    the control system further includes logic for stopping the infeed conveyor when the hold-and-release system is in operation.

11. The singulator of claim 8, wherein the control system further comprises:
    logic for determining which supports underlie items based on the image from the vision system;
    logic for determining groups of supports among those underlying items which underlie the same item;
    logic for raising the groups of supports which extend through the singulator conveyor in order to lift the items off of the singulator conveyor surface and successively lowering groups of supports which support each item.

12. The singulator of claim 8, wherein the vision system further comprises means for reducing parallax errors in the image.

13. The singulator of claim 12, wherein the means for reducing parallax errors comprises a mirror configured to focus light to the camera.

14. The singulator of claim 8, wherein the vision system is positioned upstream from the entry end of the singulator conveyor at a gap spanning the width of the entry end of the conveyor singulator and further comprises a light source for illuminating the gap as items pass over the gap, wherein the camera is positioned to receive light from the light source passing through the gap.

15. The singulator of claim 8, wherein the vision system further comprises a device for reducing parallax errors in the image.

* * * * *